US012578317B2

(12) United States Patent
Kanazawa et al.

(10) Patent No.: US 12,578,317 B2
(45) Date of Patent: Mar. 17, 2026

(54) LEARNING DATA PRODUCING METHOD, WAVEFORM ANALYSIS DEVICE, WAVEFORM ANALYSIS METHOD, AND RECORDING MEDIUM

(71) Applicant: SHIMADZU CORPORATION, Kyoto (JP)

(72) Inventors: Shinji Kanazawa, Kyoto (JP); Kenta Chinomi, Kyoto (JP); Yuki Sakamoto, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 504 days.

(21) Appl. No.: 18/114,705

(22) Filed: Feb. 27, 2023

(65) Prior Publication Data

US 2023/0280316 A1     Sep. 7, 2023

(30) Foreign Application Priority Data

Mar. 3, 2022     (JP) ................................. 2022-032634

(51) Int. Cl.
  *G01N 30/86*     (2006.01)
  *G01N 30/72*     (2006.01)
  *G06N 20/00*     (2019.01)
(52) U.S. Cl.
  CPC ......... *G01N 30/8624* (2013.01); *G01N 30/72* (2013.01); *G06N 20/00* (2019.01)
(58) Field of Classification Search
  CPC .... G01N 30/8624; G01N 30/72; G01N 30/86; G01N 30/88; G06N 20/00; G06N 3/0464; G06N 3/09
  See application file for complete search history.

(56) References Cited

U.S. PATENT DOCUMENTS

| | | | |
|---|---|---|---|
| 2008/0059079 A1* | 3/2008 | Watabe .............. | G01N 30/8675 |
| | | | 702/23 |
| 2020/0110064 A1* | 4/2020 | Sugimoto .......... | G01N 30/8651 |
| 2020/0279408 A1* | 9/2020 | Osoekawa ............ | G01N 30/86 |
| 2020/0292509 A1* | 9/2020 | Osoekawa ......... | G01N 30/8631 |
| 2021/0248417 A1 | 8/2021 | Taya et al. | |

(Continued)

FOREIGN PATENT DOCUMENTS

| | | |
|---|---|---|
| CN | 111767790 A | 10/2020 |
| JP | 2014-032133 A | 2/2014 |

(Continued)

OTHER PUBLICATIONS

"AI-developed algorithms to help analyze data", [online], Searched on Sep. 6, 2021, Shimadzu Corporation, Internet <URL: https://www.shimadzu.co.jp/news/press/jmsxjkglv6g0snf.html>.

(Continued)

*Primary Examiner* — Manuel A Rivera Vargas
(74) *Attorney, Agent, or Firm* — Renner, Otto, Boisselle & Sklar, LLP

(57) ABSTRACT

An analysis device produces learning data for training an estimation model. More specifically, the analysis device obtains a plurality of reference waveforms. In addition, the analysis device specifies information about a peak for each of the plurality of reference waveforms according to a certain criterion. The analysis device assigns the specified information about the peak to each of the plurality of reference waveforms.

15 Claims, 20 Drawing Sheets

(56)  References Cited

U.S. PATENT DOCUMENTS

| | | | |
|---|---|---|---|
| 2021/0319364 A1 | 10/2021 | Fujita et al. | |
| 2022/0196615 A1 | 6/2022 | Yamada et al. | |
| 2022/0373522 A1 | 11/2022 | Kanazawa | |
| 2023/0084819 A1* | 3/2023 | Ata | G01C 3/06 |
| | | | 356/4.01 |
| 2023/0280317 A1 | 9/2023 | Kanazawa et al. | |
| 2024/0164691 A1* | 5/2024 | Ogino | G06N 3/044 |

FOREIGN PATENT DOCUMENTS

| | | | |
|---|---|---|---|
| JP | 2020-101524 A | 7/2020 | |
| WO | 2019/092836 A1 | 5/2019 | |
| WO | 2019/092837 A1 | 5/2019 | |
| WO | 2020/044435 A1 | 3/2020 | |
| WO | 2020/225864 A1 | 11/2020 | |
| WO | 2021/064924 A1 | 4/2021 | |
| WO | 2021/191421 A1 | 9/2021 | |
| WO | 2021/261202 A1 | 12/2021 | |

OTHER PUBLICATIONS

Kanazawa, S et al., "Fake metabolomics chromatogram generation for facilitating deep learning of peak-picking neural networks", J. Biosci. Bioeng., vol. 131, Issue 2, Feb. 2021, p. 207-212 <https://doi.org/10.1016/j.ibiosc.2020.09.013>.

Olaf Ronneberger et al., "U-Net: Convolutional Networks for Biomedical Image Segmentation", [online], Submitted on May 18, 2015, arXiv.org, Internet <URL: https://arxiv.org/pdf/1505.04597.pdf>.

Japanese Office Action for corresponding Japan Patent Application No. 2022-032633, mailed on Nov. 11, 2025, with Machine Translation.

Japanese Office Action for corresponding Japan Patent Application No. 2022-032634, mailed on Nov. 11, 2025, with Machine Translation.

* cited by examiner

FIG.11

| PARTIAL WAVEFORM | CHARACTERISTIC INFORMATION (LARGE CLASSIFICATION) | CHARACTERISTIC INFORMATION (SMALL CLASSIFICATION) |
|---|---|---|
| PARTIAL WAVEFORM A | BELONG TO NON-PEAK REGION | BASELINE |
| : | : | : |
| PARTIAL WAVEFORM B | BELONG TO PEAK REGION | PEAK START POINT |
| : | : | : |
| PARTIAL WAVEFORM C | BELONG TO PEAK REGION | SINGLE PEAK |
| : | : | : |
| PARTIAL WAVEFORM D | BELONG TO PEAK REGION | UNSEPARATED PEAK |
| : | : | : |
| PARTIAL WAVEFORM E | BELONG TO PEAK REGION | PEAK END POINT |
| : | : | : |
| PARTIAL WAVEFORM F | BELONG TO NON-PEAK REGION | BASELINE |
| : | : | : |

FIG.12

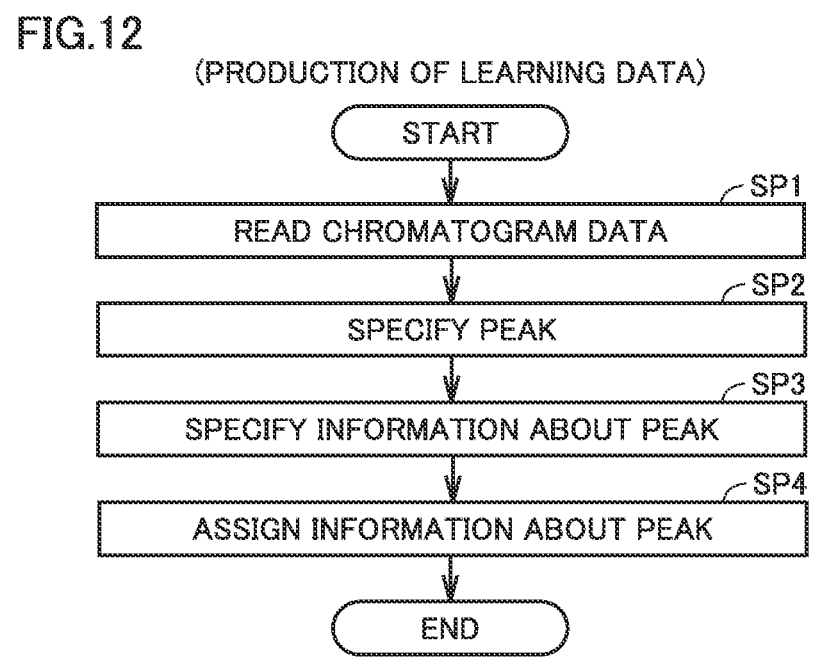

(PRODUCTION OF LEARNING DATA)

START

SP1
READ CHROMATOGRAM DATA

SP2
SPECIFY PEAK

SP3
SPECIFY INFORMATION ABOUT PEAK

SP4
ASSIGN INFORMATION ABOUT PEAK

END

FIG.13

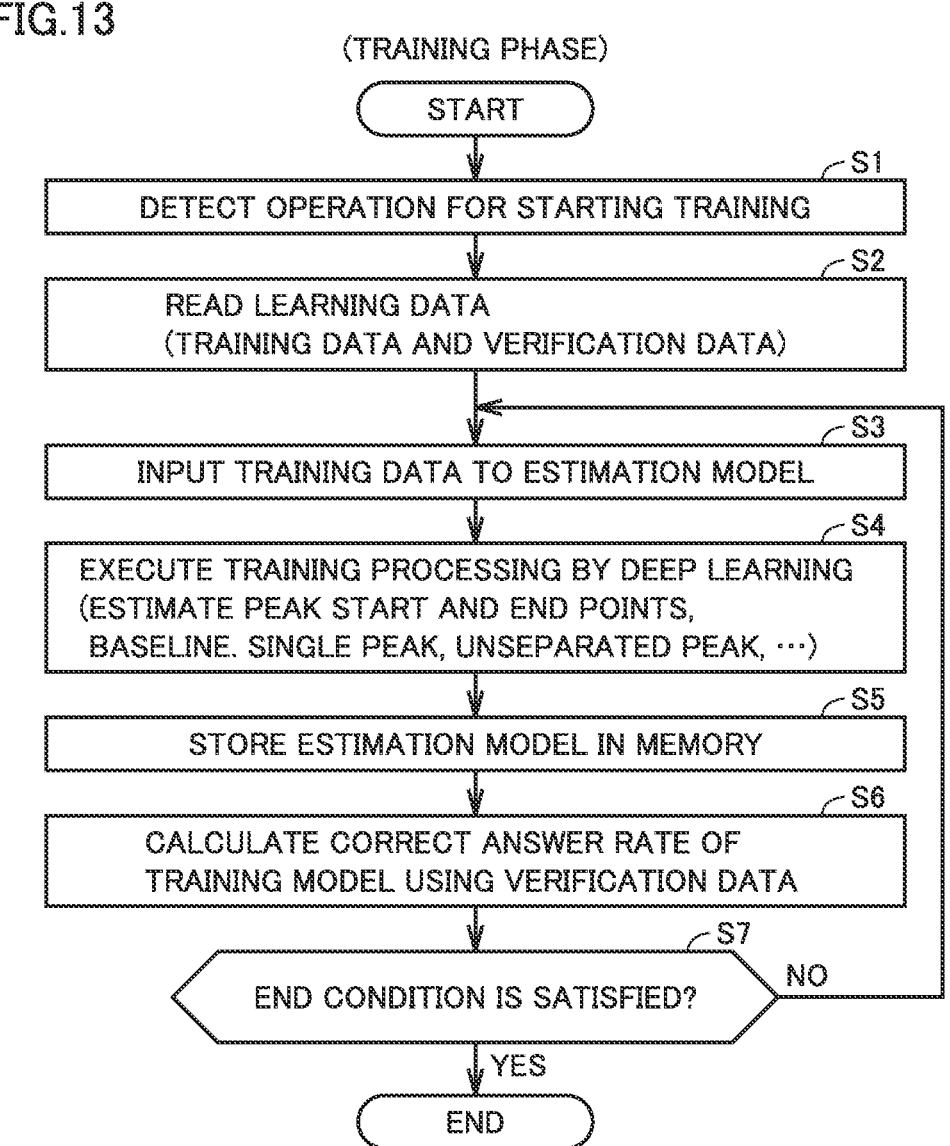

(TRAINING PHASE)

START

DETECT OPERATION FOR STARTING TRAINING ⌐S1

READ LEARNING DATA
(TRAINING DATA AND VERIFICATION DATA) ⌐S2

INPUT TRAINING DATA TO ESTIMATION MODEL ⌐S3

EXECUTE TRAINING PROCESSING BY DEEP LEARNING
(ESTIMATE PEAK START AND END POINTS,
BASELINE. SINGLE PEAK, UNSEPARATED PEAK, ⋯) ⌐S4

STORE ESTIMATION MODEL IN MEMORY ⌐S5

CALCULATE CORRECT ANSWER RATE OF
TRAINING MODEL USING VERIFICATION DATA ⌐S6

END CONDITION IS SATISFIED? ⌐S7    NO

YES

END

FIG.14

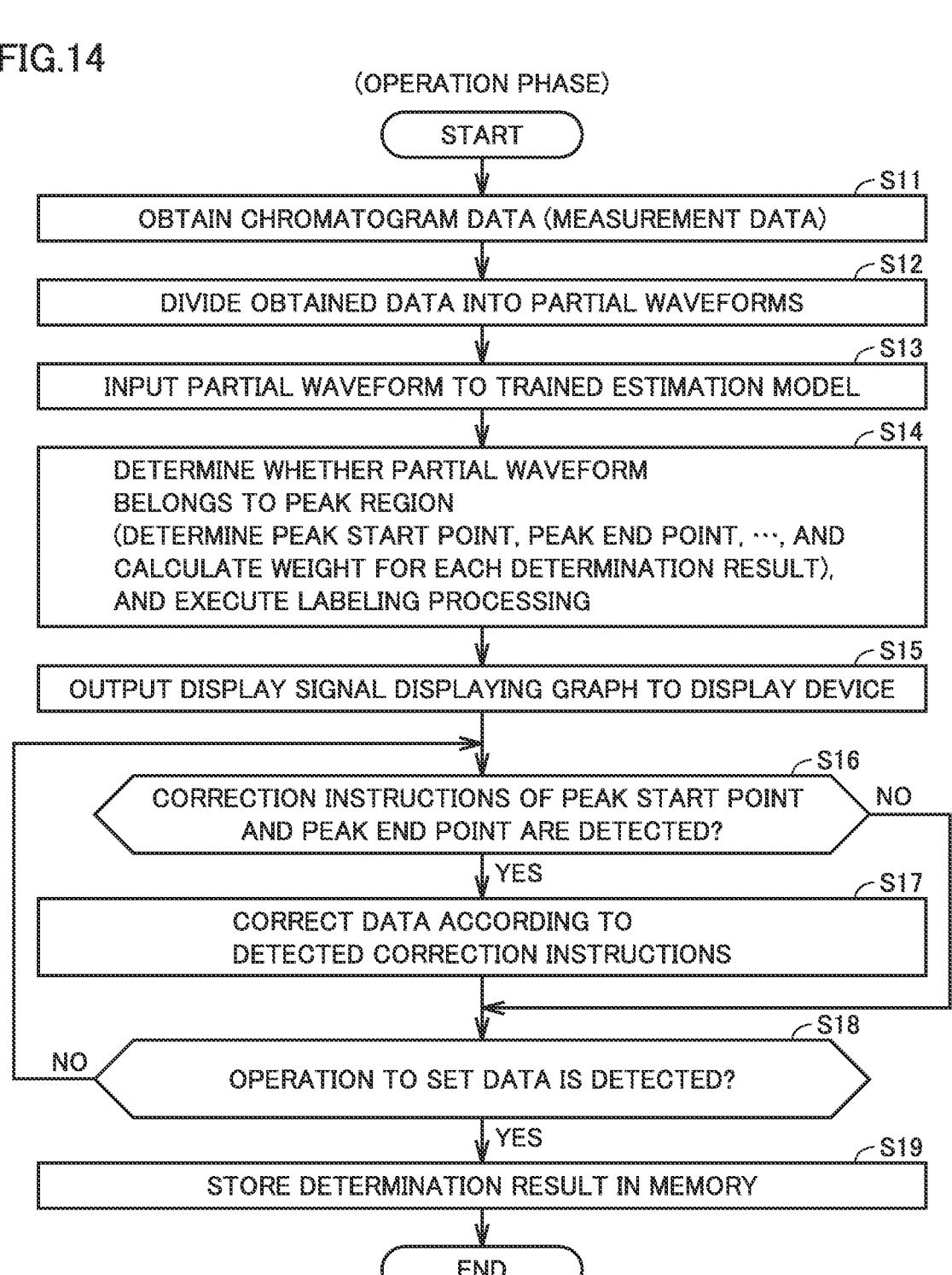

(OPERATION PHASE)

START

S11
OBTAIN CHROMATOGRAM DATA (MEASUREMENT DATA)

S12
DIVIDE OBTAINED DATA INTO PARTIAL WAVEFORMS

S13
INPUT PARTIAL WAVEFORM TO TRAINED ESTIMATION MODEL

S14
DETERMINE WHETHER PARTIAL WAVEFORM
BELONGS TO PEAK REGION
(DETERMINE PEAK START POINT, PEAK END POINT, ···, AND
CALCULATE WEIGHT FOR EACH DETERMINATION RESULT),
AND EXECUTE LABELING PROCESSING

S15
OUTPUT DISPLAY SIGNAL DISPLAYING GRAPH TO DISPLAY DEVICE

S16
CORRECTION INSTRUCTIONS OF PEAK START POINT
AND PEAK END POINT ARE DETECTED?    NO

YES

S17
CORRECT DATA ACCORDING TO
DETECTED CORRECTION INSTRUCTIONS

S18
NO    OPERATION TO SET DATA IS DETECTED?

YES

S19
STORE DETERMINATION RESULT IN MEMORY

END

FIG.17

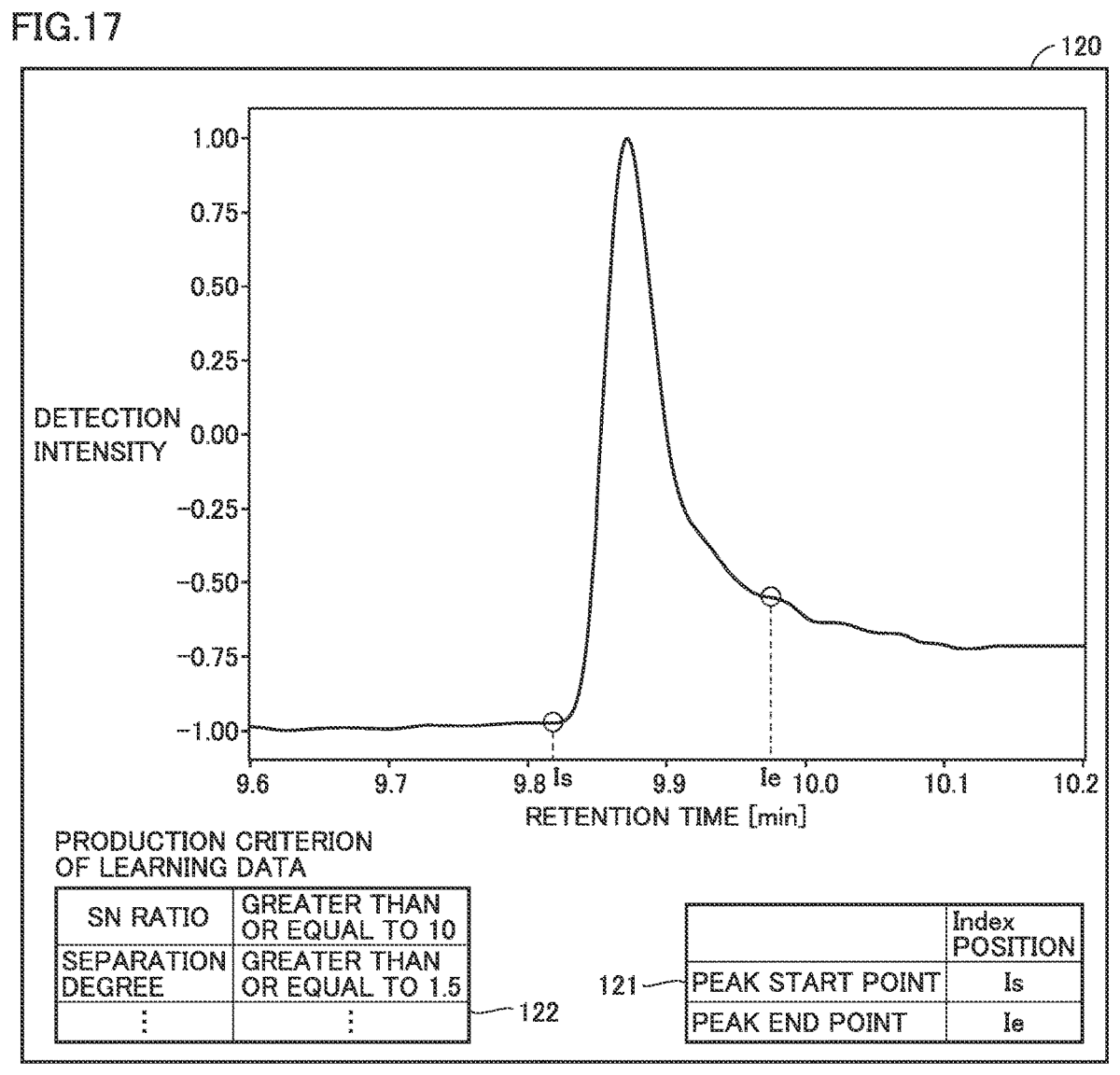

PRODUCTION CRITERION
OF LEARNING DATA

| SN RATIO | GREATER THAN OR EQUAL TO 10 |
|---|---|
| SEPARATION DEGREE | GREATER THAN OR EQUAL TO 1.5 |
| ⋮ | ⋮ |

| | Index POSITION |
|---|---|
| PEAK START POINT | Is |
| PEAK END POINT | Ie |

FIG.19

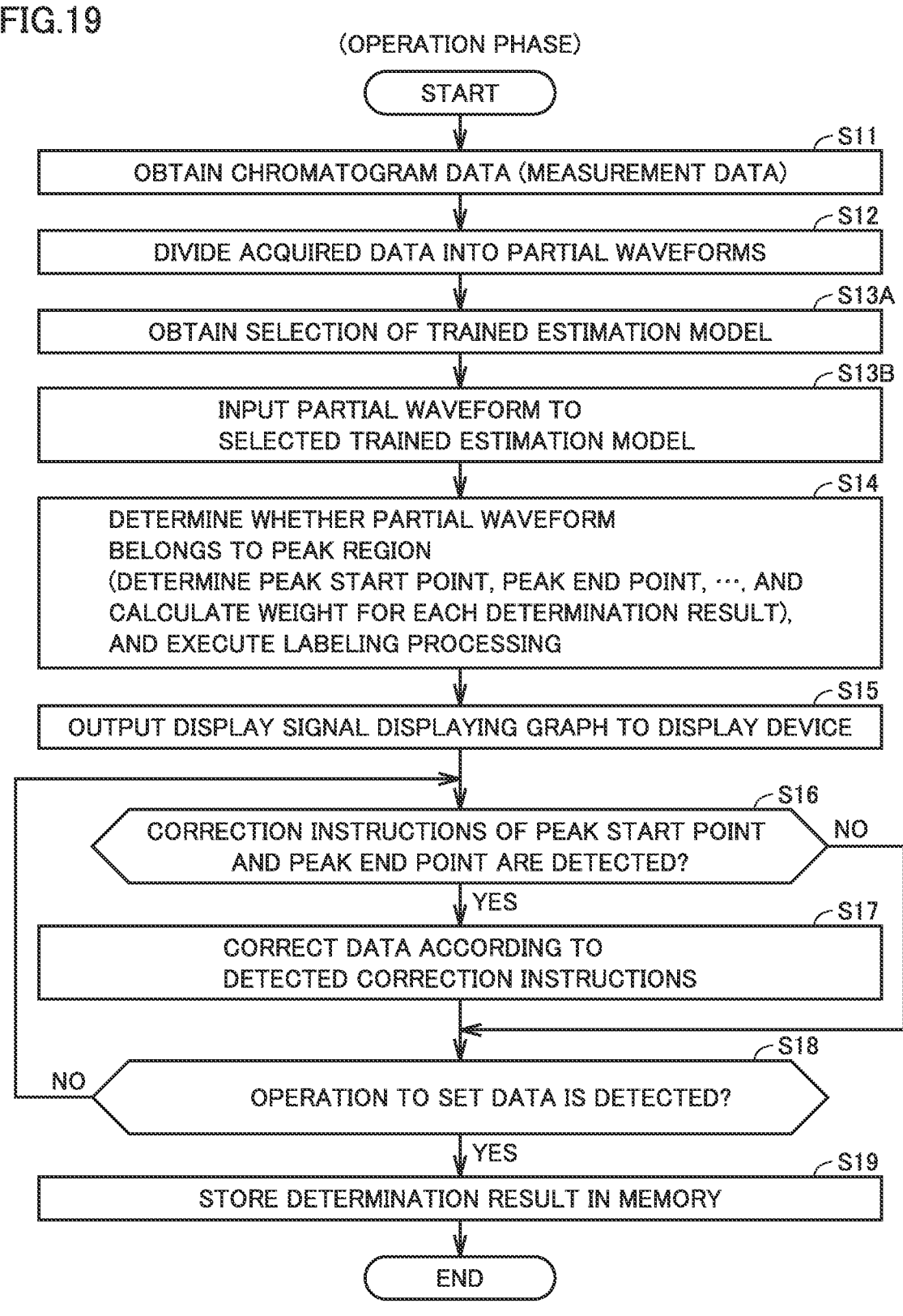

(OPERATION PHASE)

START

S11
OBTAIN CHROMATOGRAM DATA (MEASUREMENT DATA)

S12
DIVIDE ACQUIRED DATA INTO PARTIAL WAVEFORMS

S13A
OBTAIN SELECTION OF TRAINED ESTIMATION MODEL

S13B
INPUT PARTIAL WAVEFORM TO
SELECTED TRAINED ESTIMATION MODEL

S14
DETERMINE WHETHER PARTIAL WAVEFORM
BELONGS TO PEAK REGION
(DETERMINE PEAK START POINT, PEAK END POINT, ···, AND
CALCULATE WEIGHT FOR EACH DETERMINATION RESULT),
AND EXECUTE LABELING PROCESSING

S15
OUTPUT DISPLAY SIGNAL DISPLAYING GRAPH TO DISPLAY DEVICE

S16
CORRECTION INSTRUCTIONS OF PEAK START POINT
AND PEAK END POINT ARE DETECTED?　　NO

YES

S17
CORRECT DATA ACCORDING TO
DETECTED CORRECTION INSTRUCTIONS

S18
NO　　OPERATION TO SET DATA IS DETECTED?

YES

S19
STORE DETERMINATION RESULT IN MEMORY

END

FIG.20

| SAMPLE | TECHNIQUE | CORRECTION RATE (%) |
|---|---|---|
| LOW-CONCENTRATION SAMPLE | ESTIMATION MODEL | 10.8 |
| | PRIOR ART | 36.6 |
| HIGH-CONCENTRATION SAMPLE | ESTIMATION MODEL | 5.7 |
| | PRIOR ART | 10.4 |

LEARNING DATA PRODUCING METHOD, WAVEFORM ANALYSIS DEVICE, WAVEFORM ANALYSIS METHOD, AND RECORDING MEDIUM

BACKGROUND OF THE INVENTION

Field of the Invention

The present disclosure relates to a learning data producing method, a waveform analysis device, a waveform analysis method, and a recording medium for analyzing waveforms of a chromatogram and a spectrum.

Description of the Background Art

Conventionally, a chromatograph has been used to identify or quantify components contained in a sample. In the chromatograph, components in the sample are separated by a column, and components flowing out from the column are sequentially detected. Thereafter, the chromatogram in which a horizontal axis represents time while a vertical axis represents detection intensity is produced.

In order to determine a peak height and area from the chromatogram, peak start and end points rising from a baseline of the chromatogram are required to be specified. An operation of specifying the peak start and end points of the chromatogram is called peak picking. The peak height and area are determined by specifying the peak start and end points. A concentration of a compound corresponding to the peak and the like can be calculated from the peak height and area.

In recent years, an attempt to automate the peak picking using machine learning have been made. As described in the following documents, a technique using an object detection technology and a technique using a semantic segmentation technology are known as a peak picking technique using deep learning among the machine learning.

PTL 1: WO 2020/225864

NPL 1: "AI-developed algorithms to help analyze data", [online], [searched on Sep. 6, 2021], Shimadzu Corporation, Internet <URL:https://www.shimadzu.co.jp/news/press/jmsxjkglv6g0snf.html>

NPL 2: Kanazawa S, and ten others, Fake metabolomics chromatogram generation for facilitating deep learning of peak-picking neural networks. J Biosci Bioeng. 2021 February; 131(2): 207-212. doi: 10.1016/j.jbiosc NPL 3: Olaf Ronneberger, and two others, "U-Net: Convolutional Networks for Biomedical Image Segmentation", [online], arXiv.org, Internet <URL: https://arxiv.org/pdf/1505.04597.pdf>

In particular, PTL 1 discloses a technique for displaying a certainty factor of a peak picking result using a single shot multibox detector (SSD) by formulating the peak picking problem as object detection in an image recognition field. The SSD collectively outputs the peak picking result and the certainty factor for the peak picking result. NPL 2 discloses a technique for implementing the peak picking by formulating the peak picking problem as a semantic segmentation problem. NPL 3 discloses a peak picking technique using a neural network.

SUMMARY OF THE INVENTION

It has been reported that the peak picking using the machine learning as described above has higher accuracy of a derived result than the peak picking by a technique using conventional signal processing. On the other hand, in the peak picking using the machine learning, there is a demand for an explanatory property for a derived result.

An object of the present disclosure is to provide highly-accurate and highly-illustrative peak picking approach.

A learning data producing method according to one aspect of the present disclosure is a method for producing learning data for producing an estimation model that causes a computer to function to output information about a peak in a target waveform based on a plurality of reference waveforms, the method including: acquiring the plurality of reference waveforms; specifying information about a peak part according to a certain criterion for each of the plurality of reference waveforms; and assigning information about the peak part specified to each of the plurality of reference waveforms.

A waveform analysis device according to another aspect of the present disclosure includes: a waveform acquisition portion that acquires a target waveform that is unanalyzed; and a peak information acquisition portion that inputs the target waveform to a first estimation model to acquire information about a first peak in the target waveform, the first estimation model being trained, in which the first estimation model is subjected to learning processing using learning data produced by assigning information about a peak part specified according to a first certain criterion to each of a plurality of reference waveforms so as to output information about a peak in the target waveform when the target waveform is input.

A waveform analysis method according to still another aspect of the present disclosure includes: acquiring a target waveform that is unanalyzed; and inputting the target waveform to a first estimation model to acquire information about a first peak in the target waveform, the first estimation model being trained, in which the first estimation model is subjected to learning processing using learning data produced by assigning information about a peak part specified according to a first certain criterion to each of a plurality of reference waveforms so as to output information about the first peak in the target waveform when the target waveform is input.

A recording medium according to yet another aspect of the present disclosure non-transiently records a computer program, in which the computer program is executed by at least one processor of a computer to cause the computer to perform the waveform analysis method.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a view schematically illustrating a specific example of a data configuration of learning data.

FIG. 12 is a flowchart illustrating a procedure for producing the learning data.

FIG. 13 is a flowchart illustrating the procedure for producing the trained model.

FIG. 14 is a flowchart illustrating a procedure for determining chromatogram data using the trained model (trained estimation model 300).

FIG. 17 is a view illustrating an example of an image 120 displaying the determination result.

FIG. 19 is a flowchart of a modification of the flowchart in FIG. 14.

FIG. 20 is a view illustrating information comparing accuracy of the determination result obtained by the analysis device 1 using the trained model with accuracy of the determination result of the prior art.

Figure 1:
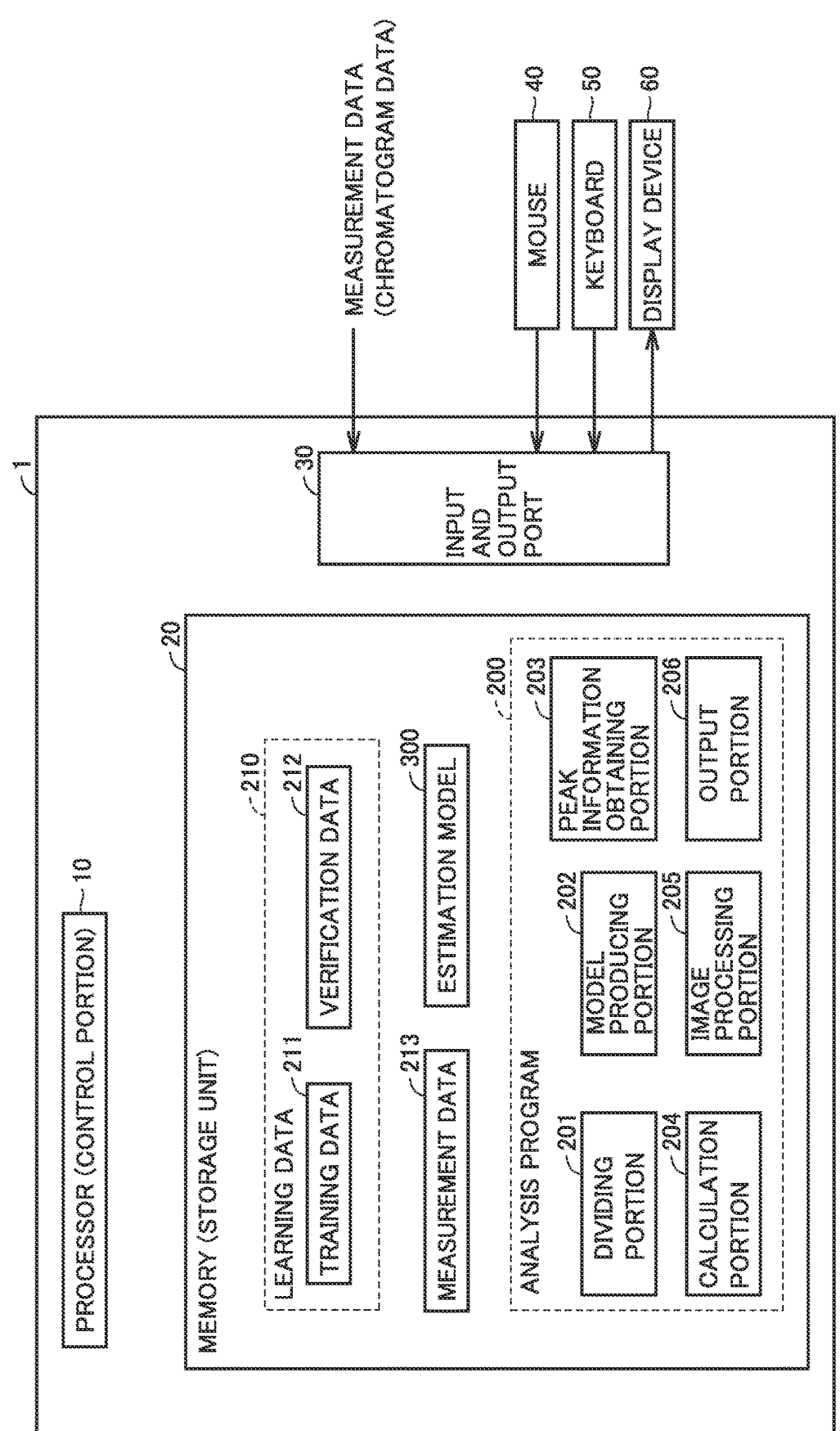
FIG. 1 is a block diagram illustrating an entire configuration of an analysis device 1.

DESCRIPTION OF THE PREFERRED
EMBODIMENTS

With reference to the drawings, an embodiment of the present disclosure will be described in detail below. In the drawings, the same or corresponding part is denoted by the same reference numeral, and the description thereof will not be repeated.

[Configuration of Analysis Device]

FIG. 1 is a block diagram illustrating an entire configuration of an analysis device 1. Analysis device 1 includes a processor 10 that functions as a control portion, a memory 20 that functions as a storage, and an input and output port 30. A mouse 40, a keyboard 50, and a display device 60 are connected to input and output port 30. A mass spectrometer or the like may be connected to input and output port 30. One or a plurality of terminal devices may be connected to input and output port 30 through the Internet, an internal network, or the like.

For example, analysis device 1 is configured using a personal computer as a base. Analysis device 1 may be configured by a server that can be accessed from one or a plurality of terminal devices through a network such as the Internet.

Measurement data (chromatogram data) is input to input and output port 30. The measurement data may be used as an analysis target or used to produce learning data of an estimation model. The measurement data may be input to analysis device 1 through a mass spectrometer connected to input and output port 30. The gas chromatograph mass spectrometry system may be configured by a mass spectrometer, a gas chromatograph connected to the mass spectrometer, and analysis device 1. A liquid chromatograph mass spectrometry system may be configured by the mass spectrometer, a liquid chromatograph connected to the mass spectrometer, and analysis device 1.

Memory 20 stores at least learning data 210, measurement data 213, an estimation model 300 used for machine learning, and an analysis program 200 executing analysis processing and machine learning processing. In memory 20, learning data 210, measurement data 213, estimation model 300, and analysis program 200 are non-temporarily stored. Measurement data 213 can be input to input and output port 30.

Learning data 210 includes a plurality of learning samples. The plurality of learning samples are classified into training data 211 and verification data 212. In one implementation example, 80% of the plurality of learning samples is classified as training data 211, and 20% is classified as verification data 212. That is, in this example, when 14250 learning samples (30 sets of sample sets each including 475 chromatograms) are prepared, 11400 learning samples are classified into training data 211, and 2850 learning samples are classified into verification data 212. However, a ratio between training data 211 and verification data 212 is not limited thereto, but can be appropriately set.

Training data 211 and verification data 212 include waveform data of the chromatogram obtained by measuring a sample containing various components using a chromatograph mass spectrometer. For example, the chromatogram is a total ion chromatogram representing a temporal change in total intensity of ions of all detected mass-to-charge ratios obtained by MS scanning measurement of components separated by a gas chromatograph using a mass spectrometer. The chromatogram may be a mass chromatogram that is measured by SIM measurement or MRM measurement to represent a temporal change in intensity of ions of a specific mass-to-charge ratio.

Training data 211 and verification data 212 include information about a peak as correct answer data. The information about the peak is specified by the peak picking. The peak picking is performed on the chromatogram included in each of training data 211 and verification data 212. The information about the peak may include information about a position of the peak (the position of the peak start point, the position of the peak top and/or the position of the peak end point).

The waveform data (chromatogram) included in each of training data 211 and verification data 212 is previously normalized so as to be within a predetermined range (for example, ±1.0) of the intensity value. A plurality of chromatograms having different intensity scales is unified by the normalization to a common intensity scale, so that the accuracy of the trained model can be enhanced.

The chromatogram included in each of training data 211 and verification data 212 may be a chromatogram obtained by measuring an actual sample, or be a chromatogram produced by simulation (for example, see NPL 2). The chromatogram produced by the simulation is an example of a pseudo-produced chromatogram.

The waveform of the chromatogram is divided into a predetermined number of partial waveforms in a time-axis direction. For example, the predetermined number is 512 or 1024, and is set such that a width (a length in the time-axis direction) of each partial waveform is at least smaller than a peak width. For example, the predetermined number is determined based on magnitude of the peak width and the number of data points required for forming one peak.

Each partial waveform data is associated with information (characteristic information) about the peak of the partial waveform. The characteristic information associated with the partial waveform includes at least information indicating whether the partial waveform belongs to a peak region or a non-peak region.

A dividing portion 201, a model producing portion 202, a peak information acquisition portion 203, a calculation portion 204, an image processing portion 205, and an output portion 206 are configured by analysis program 200.

Dividing portion 201 divides the waveform of the chromatogram into a predetermined number of partial waveforms. Using learning data 210, model producing portion 202 advances the machine learning of estimation model 300 to produce trained estimation model 300.

Peak information acquisition portion 203 performs the peak picking of the chromatogram using trained estimation model 300. Hereinafter, sometimes trained estimation model 300 is referred to as a "trained model".

Calculation portion 204 calculates the certainty factor of the determination result of peak information acquisition portion 203. Image processing portion 205 produces image data including the determination result and the certainty factor. Output portion 206 outputs a display signal including the image data from input and output port 30 to display device 60. Analysis device 1 may include display device 60.

[Example of Chromatogram]

Figure 2:
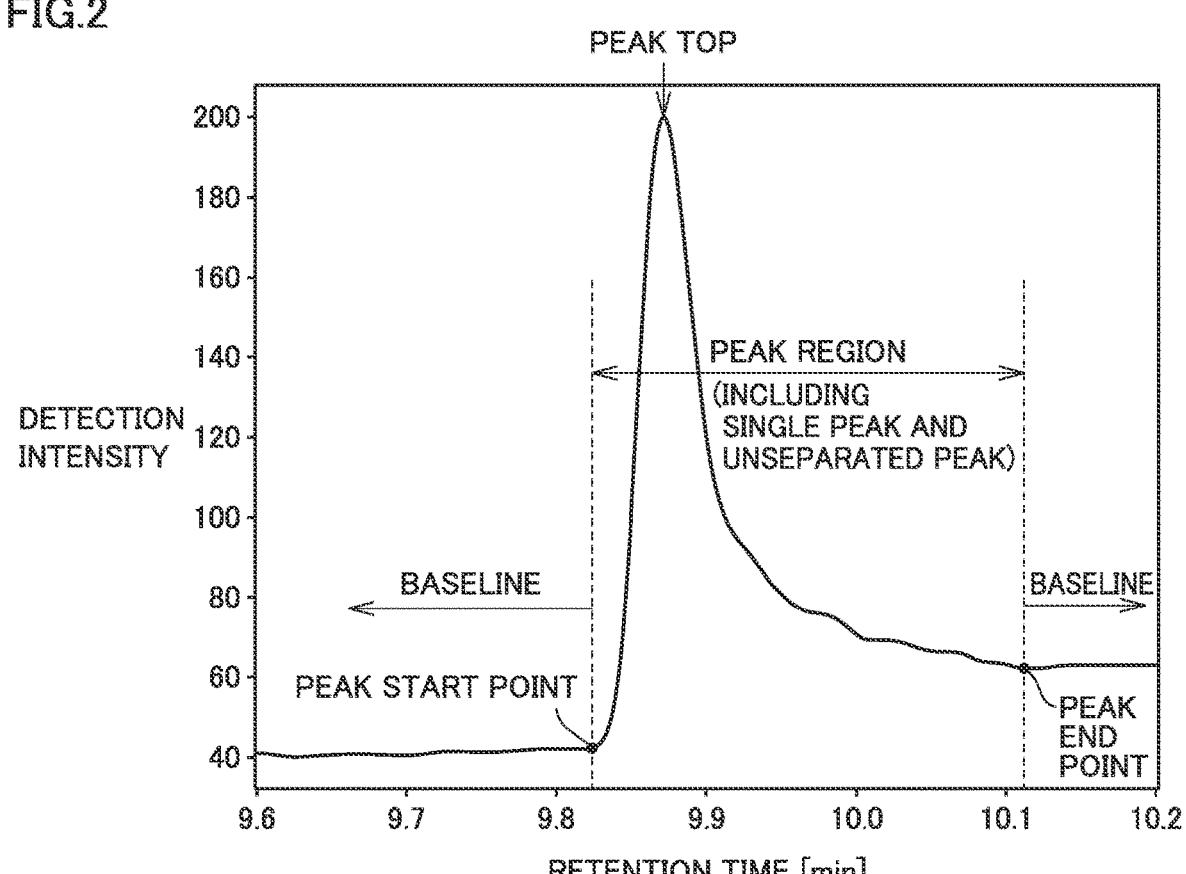
FIG. 2 is a view illustrating an example of a chromatogram.

FIG. 2 is a view illustrating an example of the chromatogram. Here, a name of each portion specified from the chromatogram will be briefly described. The chromatogram can be classified into a part of a baseline and the peak region. A rising part from the baseline is referred to as the peak start point and the peak end point. The region between the peak start point and the peak end point is referred to as the peak region. In the peak region, a part where detection intensity is very strong (the strongest part) is referred to as a peak top.

Figure 3:
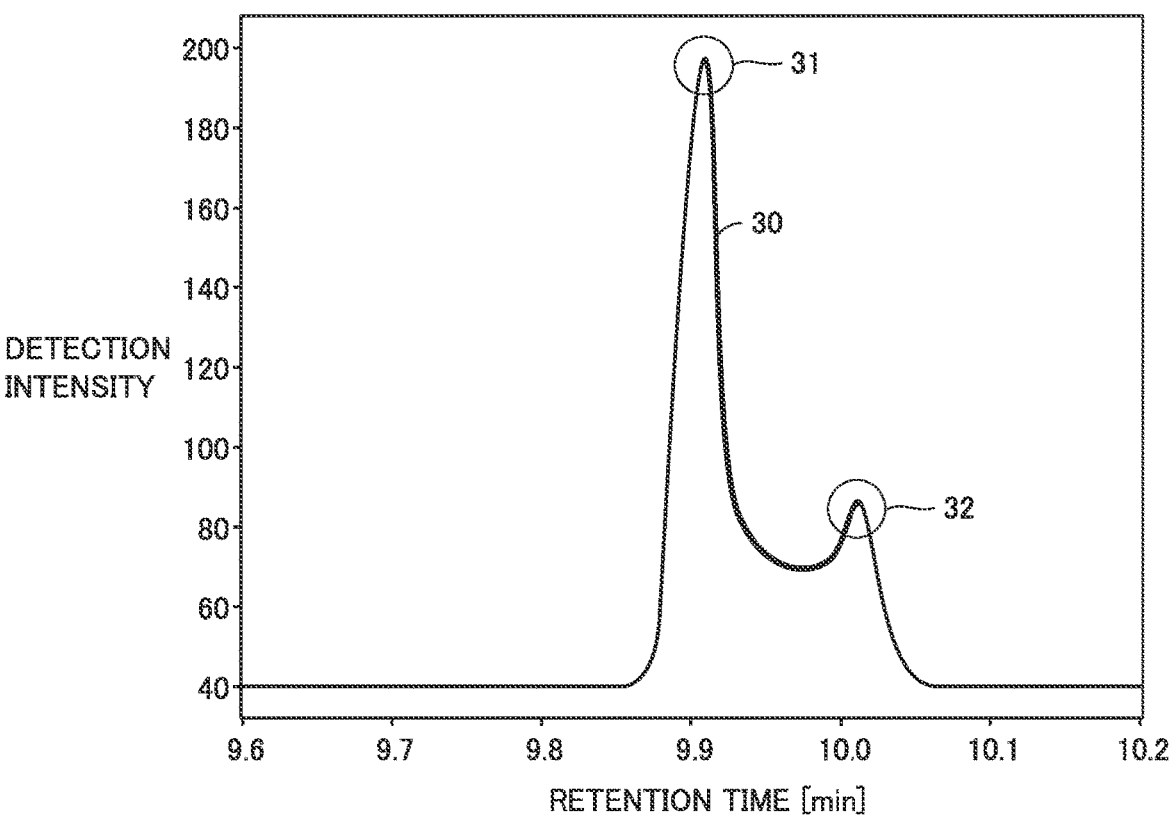
FIG. 3 is a view illustrating another example of the chromatogram.

In one implementation example, the peak region is divided into a single peak and an unseparated peak. FIG. 2 illustrates the single peak. FIG. 3 is a view illustrating another example of the chromatogram. In a waveform 30 of FIG. 3, two mountain-shaped waveforms having the peak top as the top are connected as illustrated as regions 31, 32. The detection intensity of the part corresponding to a valley between these two mountain-shaped waveforms does not drop to the intensity corresponding to the baseline. The mountain-shaped waveform including region 31 and the mountain-shaped waveform including region 32 are both referred to as the unseparated peak.

[Production of Trained Model]

Figure 4:
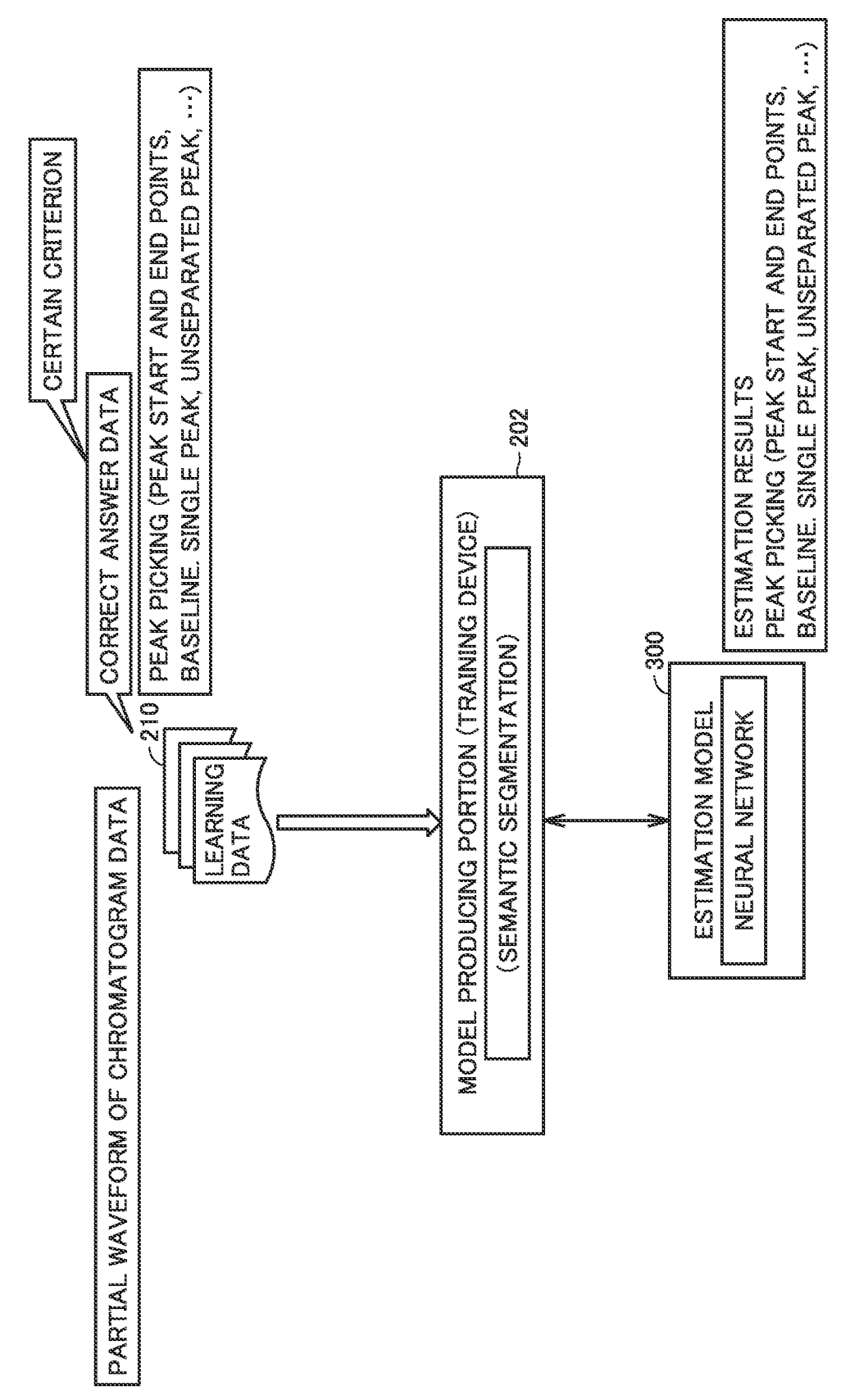
FIG. 4 is a block diagram illustrating a procedure for producing a trained model.

A procedure for producing the trained model will be described below. FIG. 4 is a block diagram illustrating the procedure for producing the trained model.

As illustrated in FIG. 4, model producing portion 202 of analysis device 1 functions as a training device. Model producing portion 202 causes estimation model 300 to learn based on learning data 210. Estimation model 300 performs deep learning using a neural network. Estimation model 300 includes parameters such as a weighting coefficient used for calculation by the neural network.

For example, a supervised learning algorithm is used to cause estimation model 300 to learn. Model producing portion 202 causes estimation model 300 to learn by the supervised learning using learning data 210.

A technique of semantic segmentation is used to train estimation model 300. The semantic segmentation is generally used to analyze the image configured by two-dimensionally-distributed pixel data. In the embodiment, the semantic segmentation is applied to the analysis of the waveform of the chromatogram configured of data arranged one-dimensionally along a time axis. For example, U-Net, SeGNet, or PSPNet can be used as an estimation model capable of executing the semantic segmentation. In the embodiment, U-Net is used.

As illustrated in FIG. 4, learning data 210 includes chromatogram data and correct answer data. More specifically, learning data 210 is a set of learning samples, and each learning sample includes the chromatogram data and the correct answer data. Still more specifically, in the embodiment, each learning sample includes the correct answer data produced for each partial waveform of the chromatogram data.

The partial waveform of the chromatogram and the correct answer data corresponding to the partial waveform of the chromatogram are input to model producing portion 202. For example, the correct answer data is a peak picking result that is already specified. The peak picking result may include the peak top.

Figure 5:
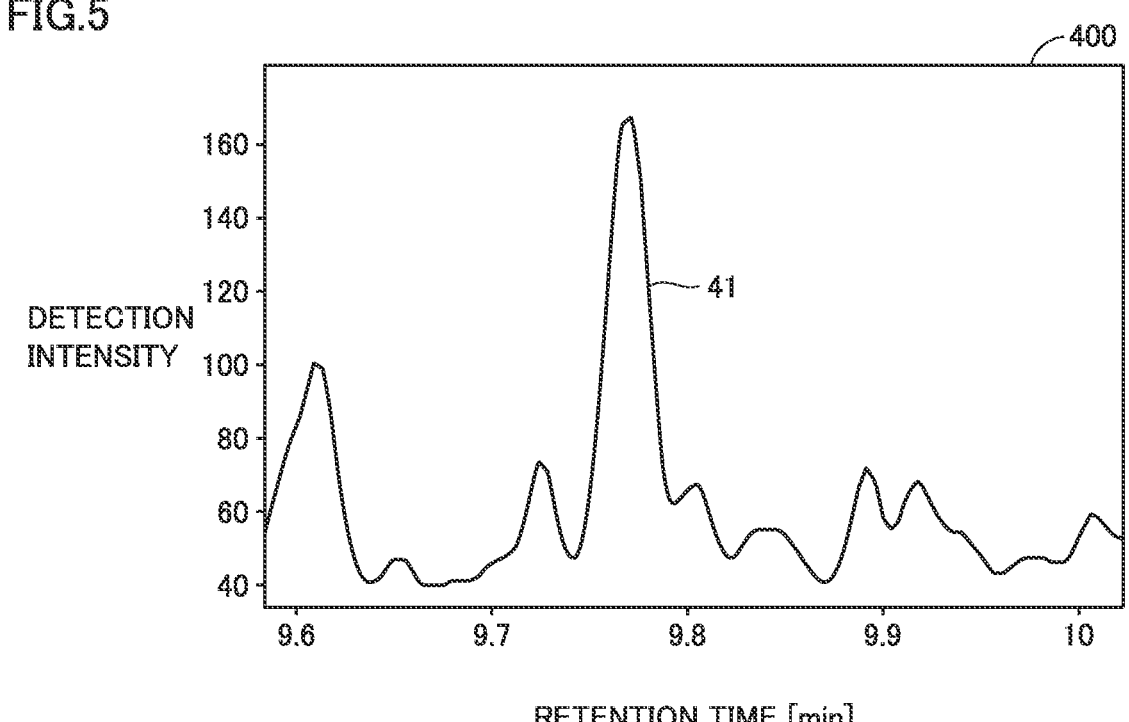
FIG. 5 is a view illustrating still another example of the chromatogram.
Figure 6:
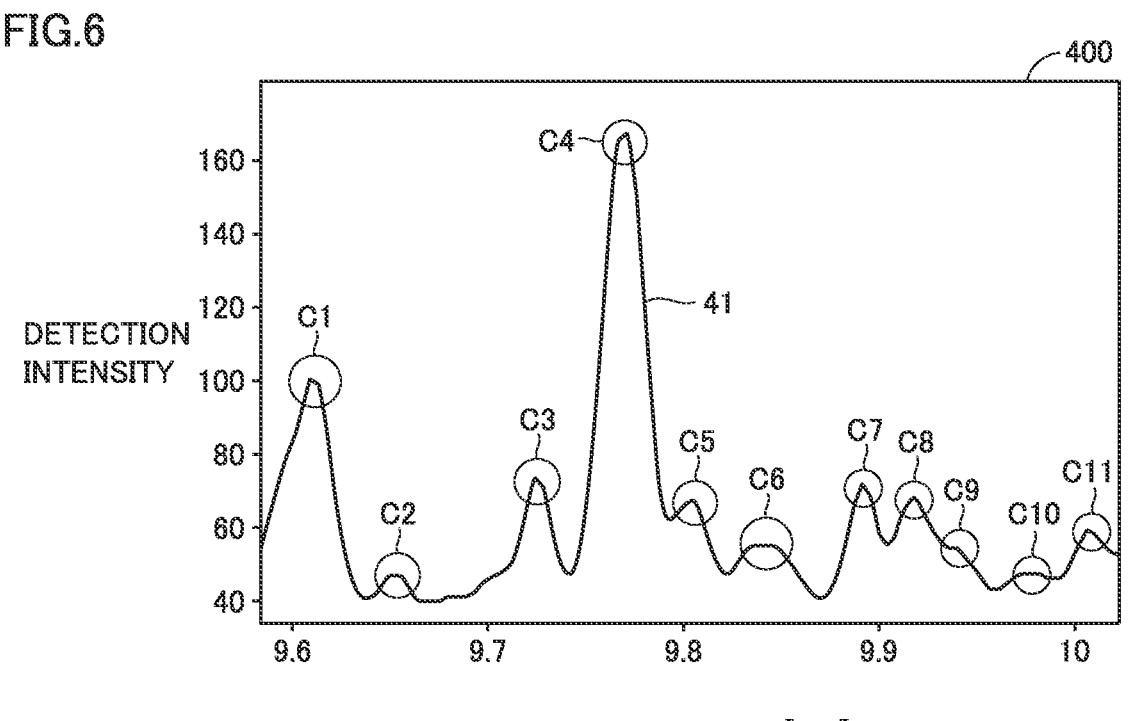
FIG. 6 is a view schematically illustrating a candidate of a peak region selected by a user with respect to a chromatogram 400 in FIG. 5.

In the embodiment, the correct answer data is produced according to a certain criterion. With reference to FIGS. 5 and 6, the production of the correct answer data will be described later.

Model producing portion 202 derives the peak picking result for the chromatogram by applying the chromatogram in learning data 210 to estimation model 300, and causes estimation model 300 to be trained based on the derived result and the correct answer data. Specifically, model producing portion 202 causes estimation model 300 to be trained by adjusting the parameter in estimation model 300 such that the result derived by estimation model 300 approaches the correct answer data.

[Production of Correct Answer Data]

With reference to FIGS. 5 and 6, the production of the correct answer data will be described. FIG. 5 is a view illustrating still another example of the chromatogram. In a chromatogram 400 of FIG. 5, a vertical axis represents the detection intensity, a horizontal axis represents a retention time, and a waveform 41 represents a change in the detection intensity with respect to the retention time. FIG. 6 is a view schematically illustrating a candidate of the peak region selected by the user with respect to chromatogram 400 in FIG. 5. In FIG. 6, regions C1 to C11 are added. Each of regions C1 to C11 indicates at least a part of each of the 11 peak region candidates selected by the user for waveform 41 in the embodiment. In the present specification, sometimes the "peak region" is simply referred to as a "peak" and the "peak region candidate" is simply referred to as a "peak candidate".

In the embodiment, as described above, the correct answer data is produced according to the certain criterion. Hereinafter, a specific example of the "certain criterion" will be described.

(Criterion 1)

An example of the above criterion is an example of a peak criterion for specifying the peak, and is that an S/N ratio of the peak candidate is greater than or equal to a certain threshold. In one implementation example, the peak candidate is specified as the peak when the S/N ratio is greater than or equal to 10, and the correct answer data is produced. On the other hand, when the S/N ratio of the peak candidate is less than 10, the peak candidate is not specified as the peak, and the correct answer data for the peak candidate is not produced. The S/N ratio is the intensity of the peak top relative to noise intensity set for the gas chromatogram.

(Criterion 2)

Another example of the above criterion is an example of the peak criterion specifying the peak, a separation degree of the peak candidate from other adjacent peak candidates being greater than or equal to a given threshold. The separation degree is an index indicating how much a certain peak is separated from another adjacent peak ("Story of separation degree_No. 1", Shimadzu Corporation, searched on Jan. 12, 2022, [online], <URL: https://www.an.shimadzu.co.jp/hplc/support/lib/lctalk/81/81intro.htm>). In one implementation example, the peak candidate is identified as the peak when the separation degree from another adjacent peak candidate is greater than or equal to 1.5, and the correct answer data is produced. On the other hand, when the separation degree between the peak candidate and another adjacent peak candidate is less than 1.5, the peak candidate is not specified as the peak, and the correct answer data for the peak candidate is not produced.

(Criterion 3)

Yet another example of the above criterion is an example of the peak criterion specifying the peak, a symmetry factor of the candidate peak being in a given range. The symmetry factor is a factor indicating a symmetry degree of the peak ("Topics of theoretical plate number and symmetry factor", Shimadzu Corporation, searched on Jan. 24, 2022, [online], <URL: https://www.an.shimadzu.co.jp/hplc/support/lib/lctalk/85/85intro.htm>).

For example, the symmetry factor is calculated as S in the following equation (1) using a peak width W at a height of $\frac{1}{20}$ of the height from the baseline to the peak top of the peak and a width f on the rising side of the peak when the peak width W is divided by 2 by a perpendicular line drawn down from the peak top to the horizontal axis.

$$S=W/2f \qquad (1)$$

In one implementation example, the peak candidate is specified as the peak when the symmetry factor of the peak candidate is in the range of 0.8 to 1.8, and the correct answer data is produced. On the other hand, when the symmetry factor of the peak candidate is not within the range of 0.8 to 1.8, the peak candidate is not specified as the peak, and the correct data is not produced.

(Criterion 4)

Figure 7:
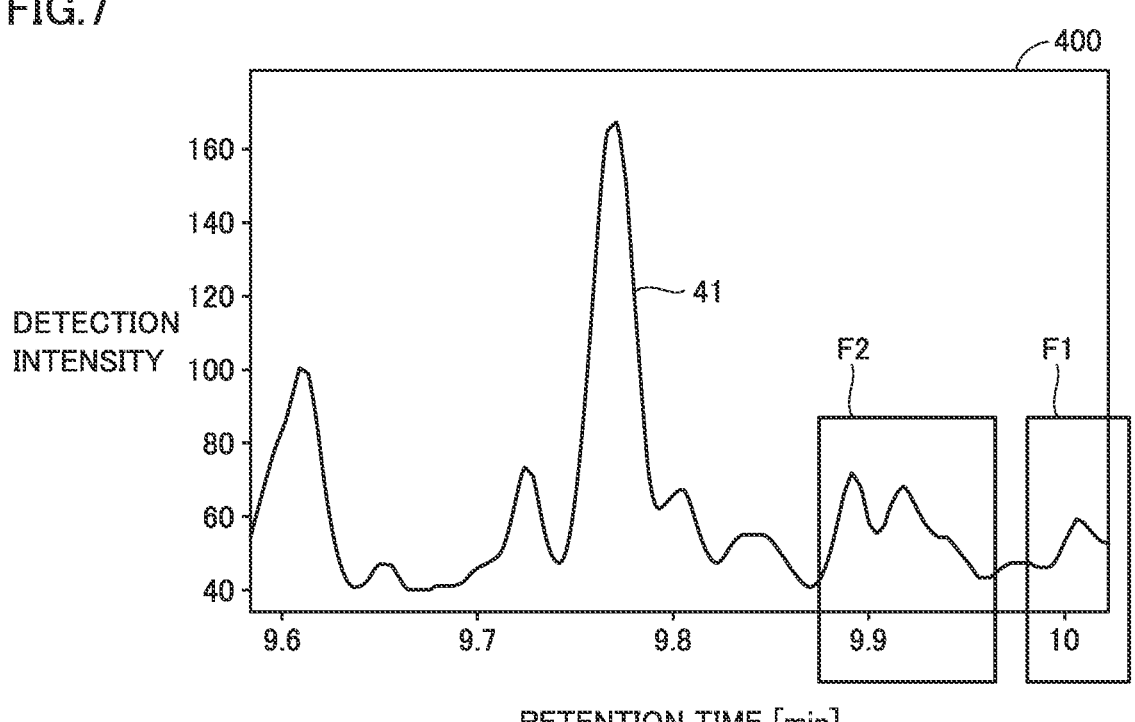
FIG. 7 is a view in which two frames are added to the chromatogram 400 in FIG. 5.
Figure 8:
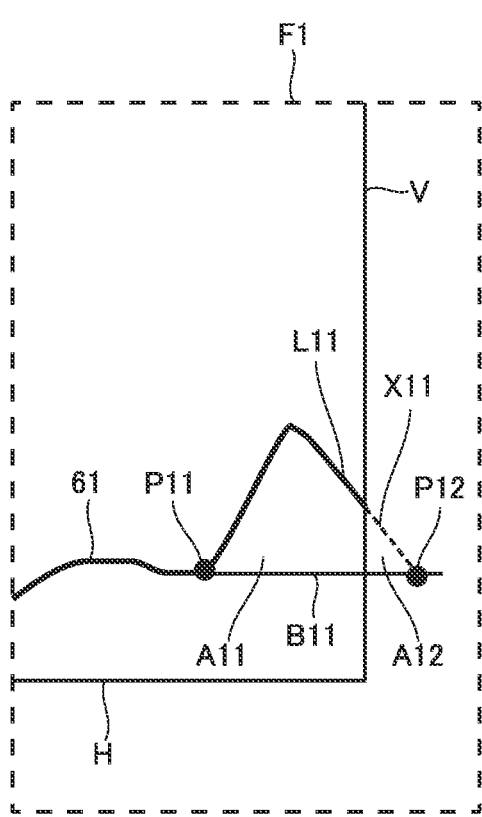
FIG. 8 is an enlarged view illustrating an element in a frame F1 of FIG. 7.

Still another example of the criterion is an example of the peak criterion specifying the peak, and when it is assumed that the entire peak candidate does not exist in the waveform, a ratio of a part existing in the waveform to the entire peak candidate is greater than or equal to a predetermined threshold. In one implementation example, when the ratio calculated for the peak candidate is greater than or equal to the predetermined threshold, the peak candidate is specified as the peak, and the correct answer data is produced. On the other hand, when the ratio calculated for the peak candidate is less than the predetermined threshold, the peak candidate is not specified as the peak, and the correct answer data is not produced. With reference to FIGS. 7 and 8, this example will be described.

FIG. 7 is a view in which two frames are added to chromatogram 400 in FIG. 5. In FIG. 7, a frame F1 surrounds a part of the waveform 41 (a part including the peak candidate indicated by a region C11 in FIG. 6), and a frame F2 surrounds the other part of the waveform 41 (a part including the peak candidate indicated by region C7 and the peak candidate indicated by region C8 in FIG. 6).

In a part surrounded by frame F1, the chromatogram ends without waiting for arrival of the peak end point of the peak candidate included in the waveform 41. That is, the peak is interrupted in a part surrounded by frame F1. In such the case, the entire image of the peak is assumed by assuming an auxiliary waveform up to the end point of the peak, the ratio of the area of the part included in the chromatogram to the area of the assumed entire image is calculated, and the calculated ratio is treated as the "ratio of the part existing in the waveform to the entire image" described above.

FIG. 8 is an enlarged view illustrating an element in frame F1 of FIG. 7. In FIG. 8, a vertical axis V and a horizontal axis H of the chromatogram are illustrated together with a waveform 61. In FIG. 8, a point P11 represents the peak start point set for the peak candidate. A line B11 represents the baseline set for the peak candidate. For example, the peak start point and the baseline are specified by the user who performs the peak picking on waveform 61.

As illustrated in FIG. 8, a virtual line X11 extending a part L11 behind the peak top of the peak candidate in waveform 61 is set. For example, line X11 is specified by the user who performs the peak picking on waveform 61. A point P12 that is an intersection of line X11 and line B11 represents a point assumed as the peak end point.

In FIG. 8, a region surrounded by waveform 61, line B11, and vertical axis V is illustrated as a region A11. Furthermore, a region surrounded by line X11, line B11, and vertical axis V is illustrated as a region A12. Then, the above-described "ratio" is calculated as a ratio of the area of region A11 to the area obtained by adding the areas of region A11 and region A12.

(Criterion 5)

Still another example of the reference is an example of the peak criterion specifying the peak, and is the height of the detection intensity of the peak top in the peak candidate. In one implementation example, when the detection intensity of the peak top included in the peak candidate is greater than or equal to a predetermined threshold, the peak candidate is specified as the peak, and the correct answer data is produced. On the other hand, when the detection intensity of the peak top included in the peak candidate is less than the predetermined threshold, the peak candidate is not specified as the peak, and the correct answer data is not produced.

(Criterion 6)

Still another example of the reference is an example of the peak criterion specifying the peak, and is the peak width in the peak candidate. In one implementation example, when a difference in retention time between two points having a given detection intensity in the peak candidate is greater than or equal to a predetermined threshold value, the peak candidate is specified as the peak, and the correct answer data is produced. On the other hand, when the difference is less than the predetermined threshold, the peak candidate is not specified as the peak, and the correct answer data is not produced.

The above-described "given detection intensity" is, for example, the intermediate detection intensity between the detection intensity of the baseline and the detection intensity of the peak top. Each of the detected intensities of the baseline and peak top is specified, for example, by the user performing the peak picking on waveform 61.

(Criterion 7)

Figure 9:
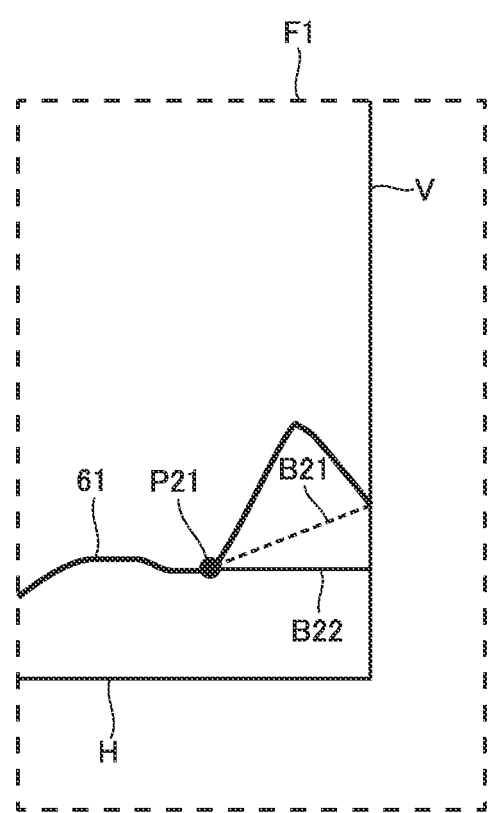
FIG. 9 is an enlarged view illustrating the element in the frame F2 of FIG. 7.

Still another example of the reference is an example of a baseline criterion specifying the baseline, and is to make inclination of the baseline horizontal. With reference to FIG. 9, this example will be described.

FIG. 9 is an enlarged view illustrating the element in frame F1 of FIG. 7. In FIG. 9, a point P21 represents the peak start point set for the peak candidate in frame F1. FIG. 9 illustrates two types of baselines (line B21 and line B22) passing through point P21. That is, in the example of FIG. 9, two types of baselines can be set for the peak candidate. Line B21 is a line connecting point P21 and the end point of waveform 61 in the chromatogram. On the other hand, line B22 is a horizontal line passing through point P21. Horizontal means parallel to horizontal axis H.

The above criterion is a criterion specifying line B21 as the baseline instead of line B22. When the peak candidate is specified as the peak, the area of the peak may change depending on the baseline criterion in the peak picking. In this sense, the information about the peak may include information specifying the baseline or information specifying the area of the peak.

(Criterion 8)

Figure 10:
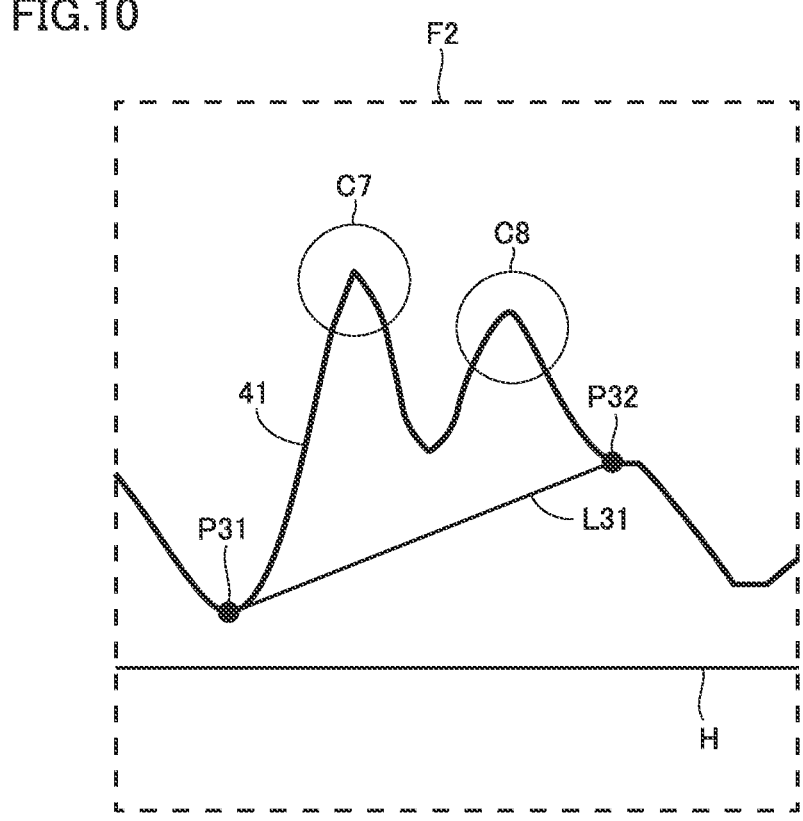
FIG. 10 is an enlarged view illustrating the element in a frame F2 of FIG. 7.

Still another example of the criterion is an example of a baseline criterion specifying the baseline, the inclination of the baseline being the inclination of the line connecting the start point of the first peak and the end point of the last peak among the plurality of adjacent peaks. With reference to FIG. 10, this example will be described.

FIG. 10 is an enlarged view illustrating the element in frame F2 of FIG. 7. In FIG. 10, the peak candidate specified by region C7 and the peak candidate specified by region C8 are adjacent to each other. In addition, in FIG. 10, the peak candidate specified by region C7 is the peak candidate that appears at the earliest time, and the peak candidate specified by region C8 is the peak candidate that appears at the latest time. A point P31 represents the peak start point specified for the peak candidate specified by region C7. A point P32 represents the peak end point specified for the peak candidate specified by region C8. A line L31 represents a line connecting point P31 and point P32.

Then, an example of the above-described baseline criterion is to use line L31 as the baseline of both peaks when the peak candidate of each of regions C7 and C8 is specified as the peak.

[Specific Example of Correct Answer Data]

FIG. 11 is a view schematically illustrating a specific example of a data configuration of the learning data. FIG. 11 illustrates an example of the data configuration of the learning sample. The example in FIG. 11 illustrates the data configuration of one learning sample. In the example of FIG. 11, the waveform included in one chromatogram is divided into a plurality of partial waveforms, and characteristic information (correct answer data) is added to each partial waveform. The data configuration in FIG. 11 is merely an example, and in the learning data of the embodiment, the waveform of one chromatogram does not need to be divided into partial waveforms.

As illustrated in FIG. 11, characteristic information about a large classification and characteristic information about a small classification are added to each partial waveform as the correct answer data. The large-classification characteristic information indicates whether the partial waveform belongs to the peak region or the non-peak region. The small-classification characteristic information indicates an attribute that the partial waveform has in the peak region or the non-peak region. For example, in a partial waveform A, "belonging to the non-peak region" is added as the large-classification characteristic information, and "baseline" is added as the small-classification characteristic information.

The type of information included in the correct answer data is not limited to the type of information indicated as the pieces of characteristic information about the large and small classifications as illustrated in FIG. 11. The correct answer data may include another type of information such as the detection intensity of the peak top.

[Processing Flow (Production of Learning Data)]

FIG. 12 is a flowchart illustrating a procedure for producing the learning data. According to the flowchart, one learning sample constituting the learning data is produced.

In one implementation example, analysis device 1 executes the processing of this flowchart by causing processor 10 to execute analysis program 200 for the learning data.

In step SP1, analysis device 1 reads chromatogram data. In one implementation example, the chromatogram data is input through input and output port 30, or produced by simulation and stored in memory 20. Processor 10 reads the chromatograph data from memory 20. The chromatogram data read in step SP1 is data used for the learning processing of estimation model 300, and is an example of the reference waveform.

In step SP2, analysis device 1 specifies the peak for the waveform included in the chromatogram data. In one implementation example, the user selects the peak candidate for the waveform, specifies the peak from the peak candidates according to the criterion, and inputs the specified peak to analysis device 1. Analysis device 1 specifies the peak with respect to the waveform included in the chromatograph data according to the input from the user. Analysis device 1 may specify the peak from the chromatogram data according to the criterion without requiring input from the user.

In step SP3, analysis device 1 specifies information about the peak. In one implementation example, the user specifies the information about the peak (for example, the characteristic information in FIG. 11) and inputs the information to analysis device 1. Analysis device 1 specifies the information about the peak according to input from the user. In specifying the information about the peak, the baseline specified according to the above criterion may be used.

In step SP4, analysis device 1 adds the information about the peak to the chromatogram data. One learning sample is produced by adding the information about the peak to the chromatogram data read in step SP1. The produced learning sample is stored in memory 20 as training data 211 or verification data 212.

Thereafter, analysis device 1 ends the processing of the flowchart in FIG. 12. Analysis device 1 produces the learning data by performing the processing in FIG. 12 for each learning sample.

[Flow of Processing (Production of Trained Model)]

FIG. 13 is a flowchart illustrating the procedure for producing the trained model. Analysis device 1 executes the processing of this flowchart by causing processor 10 to execute analysis program 200.

First, processor 10 detects an operation for starting training of estimation model 300 (step S1). For example, when the user performs the operation for starting the training of estimation model 300 using mouse 40 and keyboard 50, the operation is detected in step S1.

Subsequently, processor 10 reads learning data 210 (training data 211 and verification data 212) from memory 20 (step S2). Subsequently, processor 10 inputs training data 211 to estimation model 300 (step S3). Subsequently, in estimation model 300, the training processing by the deep learning is executed (step S4). In the U-Net used for the training of estimation model 300 in the embodiment, the weighting of the neural network is adjusted such that correct characteristic information can be obtained from the partial waveform.

More specifically, the parameter of the estimation model 300 is adjusted based on the partial waveform of training data 211 and the characteristic information associated with the partial waveform. In the processing for adjusting the parameter, processing for estimating the single peak, the unseparated peak, the peak start point, the peak end point, the baseline, and the like and processing for comparing the estimation result with correct answer data are executed.

Subsequently, processor 10 stores estimation model 300 produced according to the result of the training processing of step S4 in memory 20 (step S5).

Subsequently, processor 10 calculates a correct answer rate of the characteristic information assigned by analyzing the partial waveform of verification data 212 by estimation model 300 (step S6).

Subsequently, processor 10 determines whether a predetermined end condition is satisfied (step S7). For example, when the number of times of the training processing repeatedly performed using training data 211 reaches a predetermined number, processor 10 determines that the end condition is satisfied. When the end condition is not satisfied, processor 10 repeats the control of steps S3 to S6 until the end condition is satisfied.

When the termination condition is satisfied, processor 10 terminates the series of processing in FIG. 13.

[Analysis of Waveform of Chromatogram]

With reference to a flowchart, a procedure for analyzing the waveform of an unanalyzed chromatogram will be described below. FIG. 14 is a flowchart illustrating a procedure for determining chromatogram data using the trained model (trained estimation model 300). Processor 10 of analysis device 1 executes a part of analysis program 200, thereby implementing the processing of this flowchart.

First, processor 10 acquires the chromatogram data (measurement data) (step S11). The chromatogram data is input to analysis device 1 through a measuring instrument such as a mass spectrometer connected to input and output port 30 or a terminal device connected to input and output port 30. The data acquired in step S11 is data to be estimated of the information about the peak, and is an example of the target waveform. A waveform acquisition portion is configured by processor 10 that functions to acquire the target waveform.

Subsequently, processor 10 divides the waveform of the acquired chromatogram into a predetermined number of partial waveforms (step S12). The number of divisions of the chromatogram waveform may be the same as or different from the number of divisions of training data 211 and verification data 212.

However, the number of divisions is determined according to the length of the waveform (the length of the execution time of the chromatograph mass spectrometry) such that the width (the length in the time-axis direction) of each partial waveform is at least smaller than the width of the peak predicted to be included in the chromatogram. For example, it is conceivable to set the number of divisions to 512 or 1024.

Subsequently, processor 10 inputs the partial waveform to trained estimation model 300 (trained model) (step S13). Subsequently, processor 10 determines whether or the partial waveform belongs to the peak region as the trained model, and executes labeling processing (step S14). More specifically, the peak start point and the peak end point, the baseline, the single peak, the unseparated peak, the peak top, and the like are determined from the partial waveform. In addition, the weight of each determination result is calculated. In addition, in step S14, the characteristic information (information about whether the partial waveform belongs to the peak region) is added to each partial waveform. A peak information acquisition portion is configured by processor 10 that functions to produce the characteristic information about each partial waveform using estimation model 300 in step S14.

Subsequently, processor 10 produces a graph indicating the determination result and outputs a display signal for displaying the produced graph to display device 60 (step S15). As a result, the determination result is displayed on display device 60. For example, in a screen of display device 60, the peak start point and the peak end point are displayed on the waveform of the chromatogram.

Subsequently, processor 10 determines whether correction instructions of the peak start point and the peak end point are detected (step S16). In the embodiment, the user can perform the operation for correcting the peak start point and the peak end point on the screen of display device 60. Processor 10 advances the control to step S17 when the correction instructions are detected, and advances the control to step S18 when the correction instruction is not detected.

When the user performs the operation for correcting the peak start point and the peak end point using mouse 40 and keyboard 50, processor 10 corrects the data on the screen according to the correction instructions (step S17). In this manner, processor 10 receives the correction instructions of the user and corrects the peak start point and the peak end point.

After correcting the data, processor 10 determines whether an operation of settling the data is detected (step S18). When the operation settling the data is not detected, processor 10 returns the control to step S16. When the operation settling the data is detected, processor 10 stores the determination result (the corrected determination result when the data is corrected) in memory 20 (step S19), and ends the processing based on this flowchart.

[Example of Determination Result]

Figure 15:
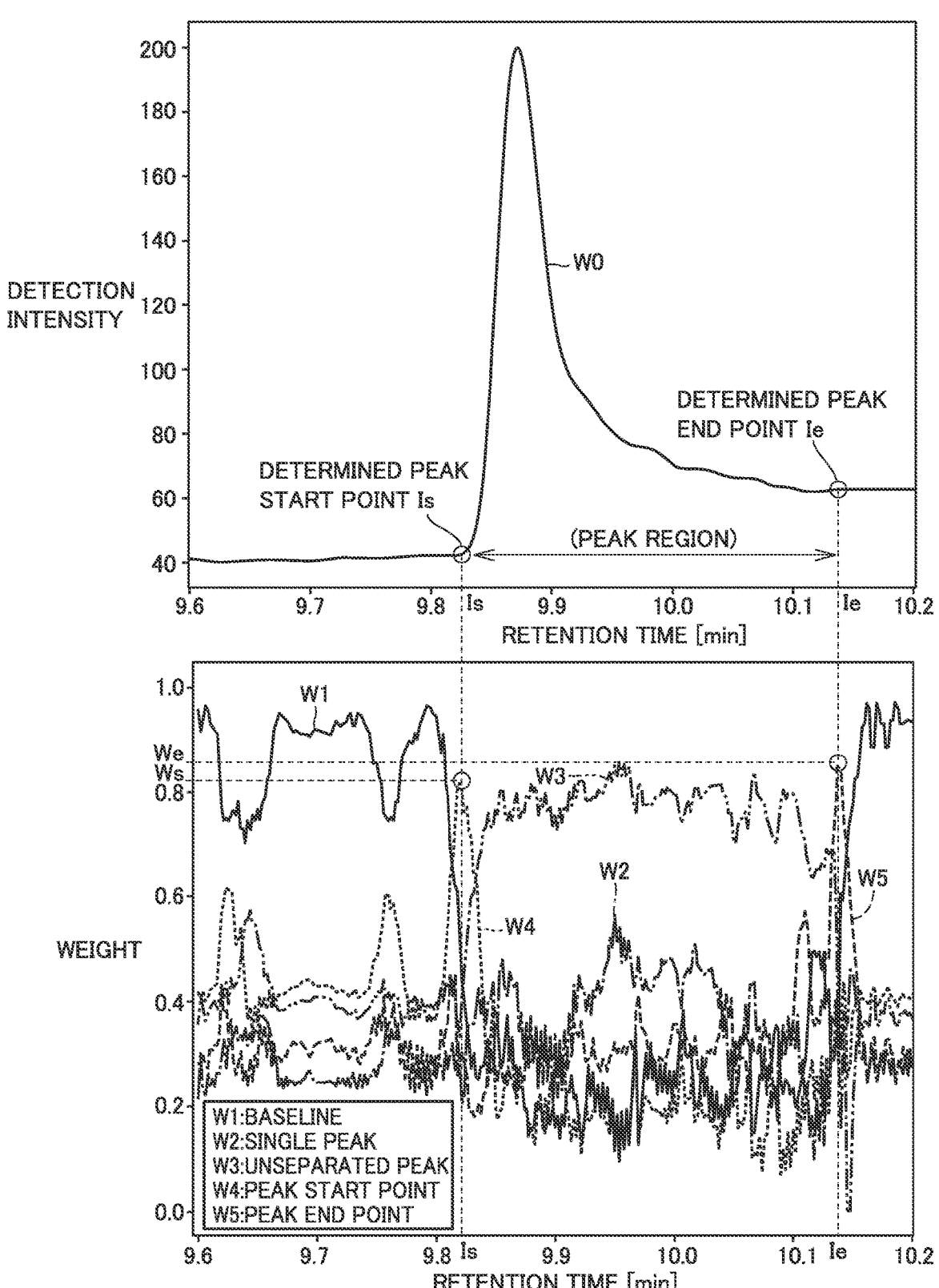
FIG. 15 is a view illustrating an example of a determination result of the trained model.

FIG. 15 is a view illustrating an example of the determination result of the trained model. An upper graph in FIG. 15 illustrates a waveform W0 of the input chromatogram. A lower graph in FIG. 15 represents the determination result of the trained model for the input chromatogram. The horizontal axis (index) of both graphs corresponds to the time axis. The vertical axis of the upper graph in FIG. 15 represents the detection intensity. The vertical axis of the lower graph in FIG. 15 indicates the weight output by the trained model. The weight is normalized to a range of 0 to 1.

Waveforms W1 to W5 indicated as the determination results of the trained model correspond to the baseline, the single peak, the unseparated peak, the peak start point, and the peak end point, respectively. By comparing waveform W0 of the chromatogram with waveforms W1 to W5, for example, it can be seen that the weight corresponding to the peak start point becomes the highest at the position of an index Is in waveform W0 of the chromatogram. Similarly, it can be seen that the weight corresponding to the peak end point becomes the highest at the position of an index Ie in waveform W0 of the chromatogram. In this case, for example, analysis device 1 determines the position of index Is in waveform W0 of the chromatogram as the peak start point, and determines the position of index Ie as the peak end point.

Here, examples of the determination target include the peak start point, the peak end point, the single peak, the unseparated peak, and the baseline, but another element such as the peak top can be added to the determination target.

As illustrated in FIG. 15, processor 10 specifies the certainty factor of the peak by calculating an average value of a weight Ws corresponding to a peak start point Is determined by the trained model and a weight We corresponding to a peak end point Ie determined by the trained model.

Figure 16:
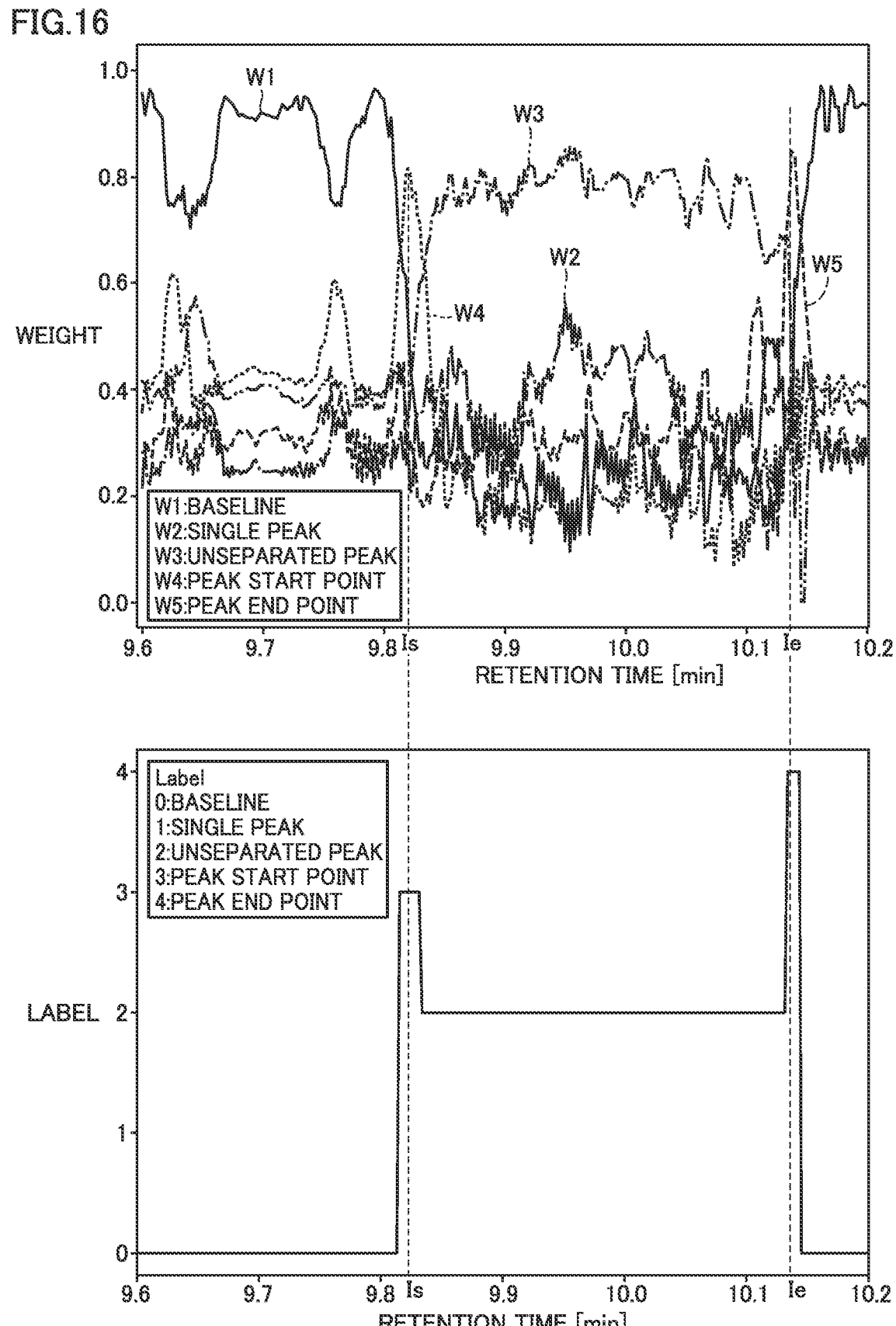
FIG. 16 is a view illustrating an example of a graph on which labeling processing is performed based on the determination result.

FIG. 16 is a view illustrating an example of a graph on which labeling processing is performed based on the determination result. The upper graph in FIG. 16 is the same as the lower graph in FIG. 15. The lower graph in FIG. 16 is a graph in which waveform W0 (see FIG. 15) of the input chromatogram is labeled based on waveforms W1 to W5. Labels 0 to 4 correspond to the baseline, the single peak, the unseparated peak, the peak start point, and the peak end point, respectively.

For example, the labeling processing is performed in the following procedure. That is, among waveforms W1 to W5, the waveform having the largest weight at the position of a certain index Ix is selected, and the value of index Ix is labeled by the selected waveform. The labeling processing ends by repeating the same processing while changing x from the initial value to the final value of the index. For example, FIG. 16 illustrates a graph in which an interval from indexes 0 to Is is labeled (label=0) as the baseline.

[Display of Determination Result]

FIG. 17 is a view illustrating an example of an image 120 displaying the determination result. Image 120 is displayed by display device 60. Image 120 includes a field 121 including peak start point Is and peak end point Ie corresponding to the determination result together with the waveform of the chromatogram to be analyzed. The determination result is information about the peak acquired for the waveform. Processor 10 may include the determination result other than peak start point Is and peak end point Ie in field 121, and include the certainty factor calculated as described above in image 120.

Image 120 further includes a field 122 representing criterion used in the production of the learning data. In one implementation example, the content of the criterion described as criterion 1 to criterion 8 is displayed in field 122. That is, the element corresponding to field 122 is included in the image included in the display signal produced and output by processor 10 in step S15. The criterion producing the learning data can affect the characteristic of the trained estimation model. Therefore, the content in field 122 can improve the explanatory property of the trained estimation model for the user.

In addition to image 120, processor 10 can selectively display the image including two graphs of an aspect in FIG. 15, the image including two graphs of an aspect in FIG. 16, and the image in which three graphs included in FIGS. 15 and 16 are disposed in the vertical direction on display device 60. The certainty factor calculated as described above may be displayed together in any image. In addition, the correct answer rate of the model calculated in step S6 (FIG. 13) may be displayed in any image. The user can input an instruction indicating which image is to be displayed to analysis device 1 using mouse 40 and keyboard 50.

[Production of a Plurality of Trained Models]

Figure 18:
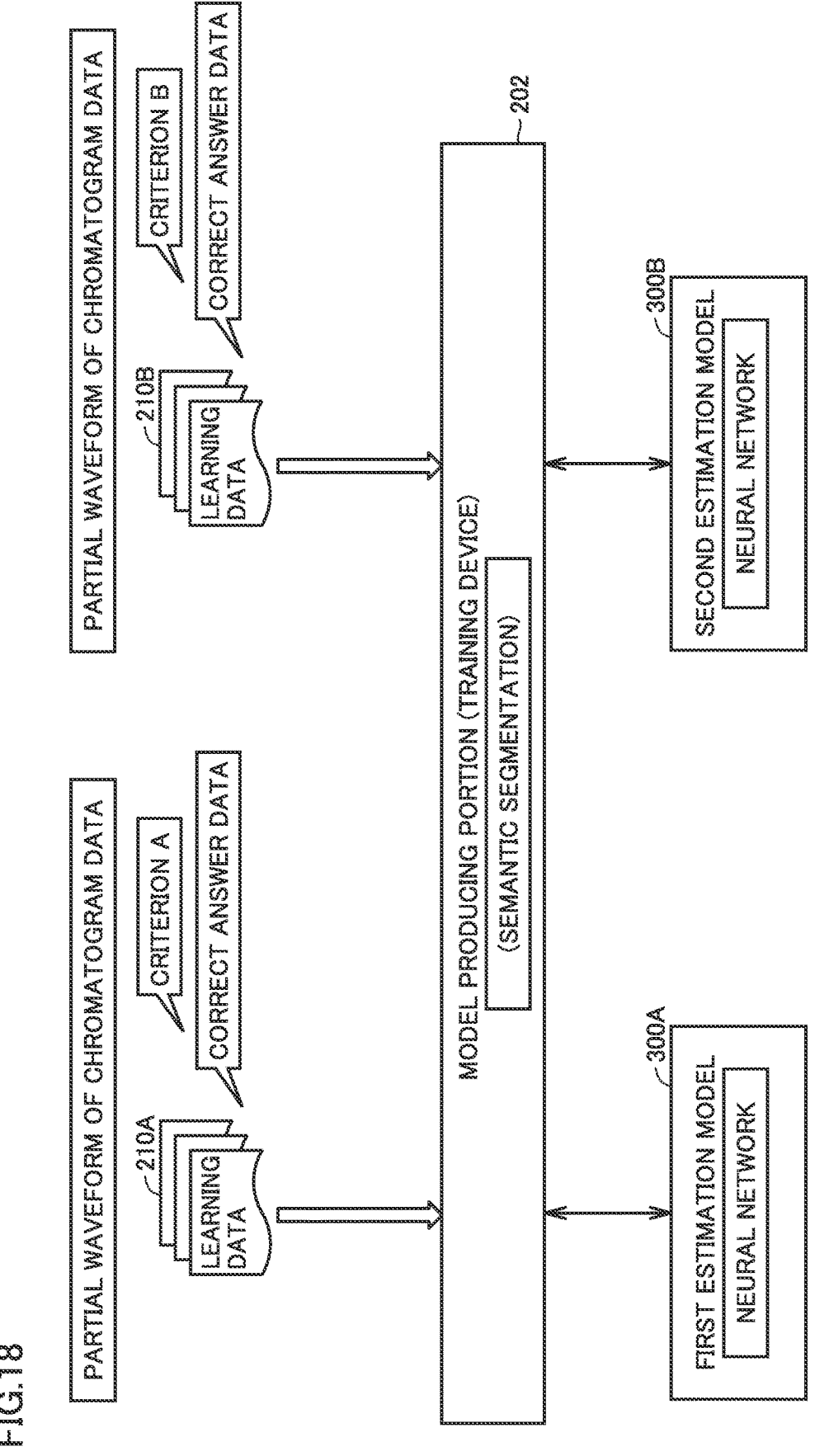
FIG. 18 is a view illustrating production of a plurality of types of trained models using a plurality of types of learning data.

Analysis device 1 may produce a plurality of types of learning data and produce a plurality of types of trained models using each of the plurality of types of learning data. With reference to FIG. 18, the production of the plurality of types of trained models will be described more specifically. FIG. 18 is a view illustrating production of the plurality of types of trained models using the plurality of types of learning data.

FIG. 18 illustrates learning data 210A produced according to a criterion A and learning data 210B produced according to a criterion B. Criterion A is an example of the first "certain criterion". Criterion B is an example of the second "certain criterion". FIG. 18 also illustrates a first estimation model 300A subjected to learning processing using learning data 210A and a second estimation model 300B subjected to learning processing using learning data 210B.

In one aspect, first estimation model 300A is an example of the "first estimation model", and second estimation model 300B is an example of the "second estimation model". Peak information acquisition portion 203 can acquire the determination result using first estimation model 300A or acquire the determination result using second estimation model 300B.

The determination result (the result of the peak picking) acquired using first estimation model 300A is an example of the information about the first peak part. The determination result (the result of the peak picking) acquired using second estimation model 300B is an example of the information about the second peak part.

Learning data 210A is produced by adding the correct answer data according to criterion A to the chromatograph data. Learning data 210B is produced by adding the correct answer data according to criterion B to the chromatograph data.

In one implementation example, criterion A and criterion B are different from each other in thresholds or ranges used in criterion 1 to criterion 6.

In one example, in criterion A, the threshold or range is set to correspond to a detection limit, and in criterion B, the threshold or range is set to correspond to a lower limit of quantitation. According to JIS_K_0211 "analytical chemistry term (basic sector)", the detection limit means a minimum value at which an analyte can be detected, and the lower limit of quantitation means a minimum amount or a minimum concentration at which an analyte can be quantified by a certain analysis method. According to criterion A, the peak candidate corresponding to a small amount of analyte that is difficult to quantify is also specified as the peak, whereas according to criterion B, only the peak candidate corresponding to an analyte having a concentration that allows quantification is specified as the peak. Thus, when estimation model 300A is used, it is expected that peaks corresponding to more analytes including the peak corresponding to the analyte having a low concentration are recognized as the peak. In addition, when estimation model 300B is used, it is expected that only the peak corresponding to the analyte having the relatively high concentration is recognized as the peak.

As another example, in criterion A, the threshold of the S/N ratio specifying the peak candidate as the peak is higher than the threshold in criterion B. For example, the threshold of the S/N ratio specifying the peak candidate as the peak is 10 in criterion A, and the threshold is 5 in criterion B. According to criterion A, only the peak candidate having a relatively large peak top is specified as the peak, whereas according to criterion B, the peak candidate having a relatively small peak top is specified as the peak. Thus, when estimation model 300A is used, only the peak having the relatively large peak top is expected to be recognized as the peak. Furthermore, when estimation model 300B is used, not only the peak having the relatively large peak top but also the peak having the relatively small peak top is expected to be recognized as the peak.

As still another example, in criterion A, the threshold of the separation degree specifying the peak candidate as the peak is higher than the threshold in criterion B. For example, in criterion A, the threshold of the separation degree specifying the peak candidate as the peak is 1.5, and in criterion B, the threshold is 0.8. According to criterion A, only the peak candidate separated from another adjacent peak candidate is specified as the peak, whereas according to criterion B, the peak candidate having a certain degree of overlap with another adjacent peak candidate is specified as the peak. Thus, when estimation model 300A is used, only the peak separated from another adjacent peak is expected to be recognized as the peak. Furthermore, when estimation model 300B is used, not only the peak separated from another adjacent peak but also the peak having some overlap with another adjacent peak candidate is expected to be recognized as the peak.

As yet another example, in criterion A, the range of the symmetry factor specifying the peak candidate as the peak is wider than the range in criterion B. For example, in criterion A, the range of the symmetry factor specifying the peak candidate as the peak is 0.8 to 1.8, and in criterion B, the range is 0.9 to 1.5. The peak candidate that is not specified as the peak because it does not have an ordered shape in the case of following criterion B is specified as the peak in the case of following criterion A. Thus, the peak that is not specified as the peak because it does not have the ordered shape when estimation model 300B is used is expected to be recognized as the peak when estimation model 300A is used.

When the plurality of types of trained models are produced as described above, analysis device 1 may output a plurality of types of determination results using each of the plurality of types of trained models for one type of chromatogram data to be analyzed. In this case, at the time of outputting each of the plurality of types of determination results, the criterion regarding the learning data used for producing each of the plurality of types of trained models may be output together with the determination result. More specifically, information indicated as field 122 in FIG. 17 may be displayed in each of the plurality of types of determination results. That is, processor 10 may perform the control for the output described as step S15 for each of the plurality of types of trained models.

In addition, when the plurality of types of trained models are produced as described above, analysis device 1 may receive selection of at least one type of trained model from the plurality of types of trained models, and output the determination result using only the selected at least one type of trained model for one type of chromatogram data to be analyzed. FIG. 19 is a flowchart of a modification of the flowchart in FIG. 14.

In the flowchart of FIG. 19, the control of step S13 in the flowchart of FIG. 14 is replaced with the control of steps S13A and S13B.

More specifically, in the procedure of FIG. 19, processor 10 divides the chromatogram into partial waveforms in step S12, and then advances the control to step S13A.

In step S13A, processor 10 acquires the selection of the trained model to be used for obtaining the determination result from among the plurality of types of trained models from the user.

In step S13B, processor 10 inputs the partial waveform to the trained model (estimation model) selected in the selection acquired in step S13A.

Thereafter, processor 10 performs the control after step S14 for each trained model to which the partial waveform is input.

[Comparison with Prior Art]

FIG. 20 is a view illustrating information comparing accuracy of the determination result obtained by analysis device 1 using the trained model with accuracy of the determination result of the prior art. FIG. 20 illustrates a ratio at which a correction is made to the determination result for each of the two types of samples to be analyzed.

The two types of samples to be analyzed are represented as "a low-concentration sample" and "a high-concentration sample". "The low-concentration sample" refers to a given volume of sample solution where 50 µL of food product is diluted with solvent. "The high-concentration sample" refers to a given volume of sample solution where 400 µL of food product is diluted with solvent.

In FIG. 20, "the technique" means a technique used to acquire the determination result. "The estimation model" represents a technique using estimation model 300 illustrated in the embodiment. That is, the determination result using the technique "estimation model" means the determination result obtained as a labeling result obtained using estimation model 300 in step S14. On the other hand, "prior" represents a technique of processing data to be analyzed with a given standard, and such the technique is implemented using, for example, a chromatography pack manufactured by Shimadzu Corporation ("Chromatography Pack Operation Q & A Waveform Processing", Shimadzu Corporation, searched on Feb. 15, 2022 [online], <URL: https://www.an.shimadzu.co.jp/data-net/support/faq/pac/pac-faq1.htm#0101>).

More specifically, the technique "estimation model" means a technique of outputting the determination result by inputting the chromatogram data of the sample to be analyzed to the trained model subjected to learning processing using the learning data produced according to the above-described criterion. On the other hand, the technique "prior" means a technique of outputting the determination result by an algorithm of performing the peak picking by directly applying the above-described criterion to the chromatogram data of the sample to be analyzed.

In FIG. 20, "the correction rate" is a rate at which the user makes the correction to the peak picking result that is the determination result. For example, when 100 sample decision results exist and when each decision result has 10 items for the peak picking (the peak start point, the peak end store, and the like), a total of 1000 items to be corrected exists. In this case, regarding the correction rate, a rate at which the user makes the correction to the correction target of the 1000 items is derived as "the correction rate". For example, when the user makes the correction to the determination result of 10 item by item, the correction rate is derived as 1.0% according to the following equation (2).

$$(10/1000) \times 100 = 1.0 \qquad (2)$$

As illustrated in FIG. 20, for the low-concentration sample, the correction rate of the technique "prior" is 36.6%, whereas the correction rate of the technique "estimation model" is 10.8%. That is, the modification rate of the technique "estimation model" is 25.5% lower than the modification rate of the technique "prior".

For the high-concentration sample, the correction rate of the technique "prior" is 10.4%, whereas the correction rate of the technique "estimation model" is 5.7%. That is, the modification rate of the technique "estimation model" is 4.7% lower than the modification rate of the technique "prior".

From the above, it can be said that the technique "estimation model" has higher accuracy than the technique "prior" in both the low-concentration sample and the high-concentration sample.

Analysis device 1 of the embodiment described above can output the highly accurate determination result. In addition, analysis device 1 outputs the determination result using the trained model subjected to the learning processing using the learning data produced according to a certain criterion. When the user is notified that the criterion and the trained model is subjected to the learning processing using the learning data produced according to the criterion, the explanatory property for the trained model can be improved.

The embodiment is merely an example, and can be appropriately changed according to the gist of the present disclosure. Here, the case of processing the waveform of the chromatogram obtained by chromatograph mass spectrometry is described as an example. However, a chromatograph including a detector (spectrophotometer) other than the mass spectrometer and a chromatogram acquired by the gas chromatograph can also be similarly analyzed by analysis device 1. Furthermore, the analysis target is not limited to the chromatogram. For example, a spectroscopic spectrum (the waveform representing the change in detection intensity with respect to the wavelength or a wavenumber axis) acquired by measurement using the spectrophotometer may be analyzed. Any waveform obtained by LC, GC, LC-PDA, LC/MS, GC/MS, LC/MS/MS, GC/MS/MS, LC/MS-IT-TOF, or the like may be analyzed.

Aspects

It is understood by those skilled in the art that the above-described embodiments and modification thereof are specific examples of the following aspects.

(Item 1) A learning data producing method according to one aspect is a method for producing learning data for producing an estimation model that causes a computer to function to output information about a peak in a target waveform based on a plurality of reference waveforms, and the method may include: acquiring the plurality of reference waveforms; specifying information about a peak part according to a certain criterion for each of the plurality of reference waveforms; and assigning information about the peak part specified to each of the plurality of reference waveforms.

According to the method described in item 1, a highly-accuracy and highly-descriptive-property peak picking technique is provided.

(Item 2) In the method described in item 1, the certain criterion may include a peak criterion specifying the peak in each of the plurality of reference waveforms and a baseline criterion specifying a baseline in each of the plurality of reference waveforms.

According to the method described in item 2, in the peak picking, the explanatory property is secured for the specification of the peak and the specification of the baseline.

(Item 3) In the method described in item 2, the peak criterion may define at least one of an S/N ratio of a peak candidate, a separation degree of the peak candidate, a symmetry factor of the peak candidate, a ratio of the peak candidate existing in the reference waveform to an entire peak assumed from the peak candidate, a height of a peak top in the peak candidate, and a width of the peak candidate in order to identify the peak candidate as the peak in each reference waveform.

According to the method described in item 3, in the peak picking, the specification of the peak is ensured in more detail.

(Item 4) In the method described in item 2 or 3, the baseline criterion may define at least one of setting a slope of the baseline to be horizontal in a graph in which a vertical axis is signal intensity while a horizontal axis is time, and setting a slope of the baseline to be a slope of a line connecting one start point and one end point among a plurality of adjacent peaks, and the one start point may be a start point of the peak appearing at an earliest time among the plurality of adjacent peaks, and the one end point may be an end point of the peak appearing at a latest time among the plurality of adjacent peaks.

According to the method described in item 4, in the peak picking, the specification of the baseline is ensured in more detail.

(Item 5) In the method described in any one of items 1 to 4, the acquiring the plurality of reference waveforms may include generating a waveform in a pseudo manner as the reference waveform.

According to the method described in item 5, preparation of learning data is facilitated.

(Item 6) A waveform analysis device described in one aspect may include: a waveform acquisition portion that acquires a target waveform that is unanalyzed; and a peak information acquisition portion that inputs the target waveform to a first estimation model to acquire information about a first peak in the target waveform, the first estimation model being trained, in which the first estimation model may be subjected to learning processing using learning data produced by assigning information about a peak part specified according to a first certain criterion to each of a plurality of reference waveforms so as to output information about a peak in the target waveform when the target waveform is input.

According to the waveform analysis device described in item 6, a highly-accuracy and highly-explanatory-property peak picking technique is provided.

(Item 7) The waveform analysis device described in item 6 may further include an output portion that outputs the information about the first peak and the first certain criterion.

According to the waveform analysis device described in item 7, the explanatory property in the peak picking is more reliably ensured.

(Item 8) In the waveform analysis device described in item 6 or 7, the first certain criterion may include a peak criterion specifying the peak in each of the plurality of reference waveforms and a baseline criterion specifying a baseline in each of the plurality of reference waveforms.

According to the waveform analysis device described in item 8, in the peak picking, the explanatory property is secured for the specification of the peak and the specification of the baseline.

(Item 9) In the waveform analysis device described in any one of items 6 to 8, the peak criterion may define at least one of an S/N ratio of a peak candidate, a separation degree of the peak candidate, a symmetry factor of the peak candidate, a ratio of the peak candidate existing in the reference waveform to an entire peak assumed from the peak candidate, a height of a peak top in the peak candidate, and a width of the peak candidate in order to identify the peak candidate as the peak in each reference waveform.

According to the waveform analysis device described in item 9, in the peak picking, the specification of the peak is ensured in more detail.

(Item 10) In the waveform analysis device described in item 8 or 9, the baseline criterion may define at least one of setting a slope of the baseline to be horizontal in a graph in which a vertical axis is signal intensity while a horizontal axis is time, and setting a slope of the baseline to be a slope of a line connecting one start point and one end point among a plurality of adjacent peaks, and the one start point may be a start point of the peak appearing at an earliest time among the plurality of adjacent peaks, and the one end point may be an end point of the peak appearing at a latest time among the plurality of adjacent peaks.

According to the waveform analysis device described in item 10, in the peak picking, the specification of the baseline is ensured in more detail.

(Item 11) In the waveform analysis device described in any one of items 6 to 10, the peak information acquisition portion may input the target waveform to a second estimation model to acquire information about a second peak in the target waveform, the second estimation model being trained, and the second estimation model may be subjected to learning processing using learning data produced by assigning information about a peak part specified according to a second certain criterion different from the first certain criterion to each of the plurality of reference waveforms so as to output information about a second peak in the target waveform when the target waveform is input.

According to the waveform analysis device described in item 11, a result of the peak picking is provided according to each of the plurality of aspects.

(Item 12) In the waveform analysis device described in item 7, the peak information acquisition portion may input the target waveform to a second estimation model to acquire information about a second peak in the target waveform, the second estimation model being trained, the second estimation model may be subjected to learning processing using learning data produced by assigning information about a peak part specified according to a second certain criterion different from the first certain criterion to each of a plurality of reference waveforms so as to output information about the second peak in the target waveform when the target waveform is input, and the output portion may output the information about the second peak and the second certain criterion.

According to the waveform analysis device described in item 12, a result of the peak picking is provided according to each of the plurality of aspects.

(Item 13) A waveform analysis method according to one aspect may include: acquiring a target waveform that is unanalyzed; and inputting the target waveform to a first estimation model to acquire information about a first peak in the target waveform, the first estimation model being trained, in which the first estimation model may be subjected to learning processing using learning data produced by assigning information about a peak part specified according to a first certain criterion to each of a plurality of reference waveforms so as to output information about the first peak in the target waveform when the target waveform is input.

According to the waveform analysis method described in item 13, a highly-accuracy and highly-explanatory-property peak picking technique is provided.

(Item 14) The waveform analysis method described in item 13 may further include outputting the information about the first peak and the first certain criterion.

According to the waveform analysis method described in item 14, the explanatory property in the peak picking is more reliably ensured.

(Item 15) In the waveform analysis method described in item 13 or 14, the first certain criterion may include a peak criterion specifying a peak in each of the plurality of reference waveforms and a baseline criterion specifying a baseline in each of the plurality of reference waveforms.

According to the waveform analysis method described in item 15, in the peak picking, the specification of the peak is ensured in more detail.

(Item 16) In the waveform analysis method described in item 15, the peak criterion may define at least one of an S/N ratio of a peak candidate, a separation degree of the peak candidate, a symmetry factor of the peak candidate, a ratio of the peak candidate existing in the reference waveform to an entire peak assumed from the peak candidate, a height of a peak top in the peak candidate, and a width of the peak candidate in order to identify the peak candidate as the peak in each reference waveform.

According to the waveform analysis method described in item 16, the specification of the baseline is ensured in more detail in the peak picking.

(Item 17) In the waveform analysis method described in item 15 or 16, the baseline criterion may define at least one of setting a slope of the baseline to be horizontal in a graph in which a vertical axis is signal intensity while a horizontal axis is time, and setting a slope of the baseline to be a slope of a line connecting one start point and one end point among a plurality of adjacent peaks, and the one start point may be a start point of the peak appearing at an earliest time among the plurality of adjacent peaks, and the one end point may be an end point of the peak appearing at a latest time among the plurality of adjacent peaks.

According to the waveform analysis method described in item 17, the specification of the baseline is ensured in more detail in the peak picking.

(Item 18) The waveform analysis method described in item 14 may further include inputting the target waveform to a second estimation model to acquire information about a second peak in the target waveform, the second estimation model being trained, in which the second estimation model may be subjected to learning processing using learning data produced by assigning information about a peak part specified according to a second certain criterion different from the first certain criterion to each of a plurality of reference waveforms so as to output information about the second peak in the target waveform when the target waveform is input; and outputting the information about the second peak and the second certain criterion.

According to the waveform analysis method described in item 18, a result of the peak picking is provided according to each of the plurality of aspects.

(Item 19) In the waveform analysis method described in item 18, only one of the inputting the target waveform to the first estimation model to acquire information about the first peak in the target waveform and the inputting the target waveform to the second estimation model to acquire the information about the second peak in the target waveform may be performed.

According to the waveform analysis method described in item 19, the result of the peak picking is provided according to some of the plurality of aspects.

(Item 20) A recording medium according to one aspect may non-temporarily record a computer program, in which the computer program may be executed by at least one processor of a computer to cause the computer to perform the waveform analysis method described in any one of items 13 to 19.

According to the recording medium described in item 20, a highly-accuracy and highly-explanatory-property peak picking technique is provided.

Although the embodiment of the present invention has been described, it should be considered that the disclosed embodiment is an example in all respects and not restrictive. The scope of the present invention is indicated by the claims, and it is intended that all modifications within the meaning and scope of the claims are included in the present invention.

What is claimed is:

1. A method for producing learning data for producing an estimation model that causes a computer to function to output information about a peak in a target waveform based on a plurality of reference waveforms, the method comprising:

acquiring the plurality of reference waveforms;

specifying information about a peak part according to a certain criterion for each of the plurality of reference waveforms; and assigning information about the peak part specified to each of the plurality of reference waveforms, wherein the certain criterion includes a peak criterion specifying the peak in each of the plurality of reference waveforms and a baseline criterion specifying a baseline in each of the plurality of reference waveforms and, wherein the peak criterion defines at least one of an S/N ratio of a peak candidate, a separation degree of the peak candidate, a symmetry factor of the peak candidate, a ratio of the peak candidate existing in the reference waveforms to an entire peak assumed from the peak candidate, a height of a peak top in the peak candidate, and a width of the peak candidate in order to identify the peak candidate as the peak in each reference waveforms.

2. The method according to claim 1, wherein the baseline criterion defines at least one of setting a slope of the baseline to be horizontal in a graph in which a vertical axis is signal intensity while a horizontal axis is time, and setting a slope of the baseline to be a slope of a line connecting one start point and one end point among a plurality of adjacent peaks, and the one start point is a start point of the peak appearing at an earliest time among the plurality of adjacent peaks, and the one end point is an end point of the peak appearing at a latest time among the plurality of adjacent peaks.

3. The method according to claim 1, wherein the acquiring the plurality of reference waveforms includes generating a waveform in a pseudo manner as the reference waveform.

4. A waveform analysis device comprising:

a waveform acquisition portion that acquires a target waveform that is unanalyzed; and a peak information acquisition portion that inputs the target waveform to a first estimation model to acquire information about a first peak in the target waveform, the first estimation model being trained, wherein the first estimation model is subjected to learning processing using learning data produced by assigning information about a peak part specified according to a first certain criterion to each of a plurality of reference waveforms so as to output information about a peak in the target waveform when the target waveform is input, and wherein the peak criterion defines at least one of an S/N ratio of a peak candidate, a separation degree of the peak candidate, a symmetry factor of the peak candidate, a ratio of the peak candidate existing in the reference waveform to an entire peak assumed from the peak candidate, a height of a peak top in the peak candidate, and a width of the peak candidate in order to identify the peak candidate as the peak in each reference waveform.

5. The waveform analysis device according to claim 4, further comprising an output portion that outputs the information about the first peak and the first certain criterion.

6. The waveform analysis device according to claim 5, wherein the peak information acquisition portion inputs the target waveform to a second estimation model to acquire information about a second peak in the target waveform, the second estimation model being trained, the second estimation model is subjected to learning processing using learning data produced by assigning information about a peak part specified according to a second certain criterion different from the first certain criterion to each of a plurality of reference waveforms so as to output information about the second peak in the target waveform when the target waveform is input, and the output portion outputs the information about the second peak and the second certain criterion.

7. The waveform analysis device according to claim 4, wherein the first certain criterion includes a peak criterion specifying the peak in each of the plurality of reference waveforms and a baseline criterion specifying a baseline in each of the plurality of reference waveforms.

8. The waveform analysis device according to claim 7, wherein the baseline criterion defines at least one of setting a slope of the baseline to be horizontal in a graph in which a vertical axis is signal intensity while a horizontal axis is time, and setting a slope of the baseline to be a slope of a line connecting one start point and one end point among a plurality of adjacent peaks, and the one start point is a start point of the peak appearing at an earliest time among the plurality of adjacent peaks, and the one end point is an end point of the peak appearing at a latest time among the plurality of adjacent peaks.

9. The waveform analysis device according to claim 4, wherein the peak information acquisition portion inputs the target waveform to a second estimation model to acquire information about a second peak in the target waveform, the second estimation model being trained, and the second estimation model is subjected to learning processing using learning data produced by assigning information about a peak part specified according to a second certain criterion different from the first certain criterion to each of the plurality of reference waveforms so as to output information about a second peak in the target waveform when the target waveform is input.

10. A waveform analysis method comprising:

acquiring a target waveform that is unanalyzed; and inputting the target waveform to a first estimation model to acquire information about a first peak in the target waveform, the first estimation model being trained, wherein the first estimation model is subjected to learning processing using learning data produced by assigning information about a peak part specified according to a first certain criterion to each of a plurality of reference waveforms so as to output information about the first peak in the target waveform when the target waveform is input, wherein the first certain criterion includes a peak criterion specifying a peak in each of the plurality of reference waveforms and a baseline criterion specifying a baseline in each of the plurality of reference waveforms, and wherein the peak criterion defines at least one of an S/N ratio of a peak candidate, a separation degree of the peak candidate, a symmetry factor of the peak candidate, a ratio of the peak candidate existing in the reference waveform to an entire peak assumed from the peak candidate, a height of a peak top in the peak candidate and a width of the peak candidate in order to identify the peak candidate as the peak in each reference waveform.

11. The waveform analysis method according to claim 10, further comprising outputting the information about the first peak and the first certain criterion.

12. The waveform analysis method according to claim 11, further comprising:

inputting the target waveform to a second estimation model to acquire information about a second peak in the target waveform, the second estimation model being trained, wherein the second estimation model is subjected to learning processing using learning data produced by assigning information about a peak part specified according to a second certain criterion different from the first certain criterion to each of a plurality of reference waveforms so as to output the information about the second peak in the target waveform when the target waveform is input; and outputting the information about the second peak and the second certain criterion.

13. The waveform analysis method according to claim 12, wherein only one of the inputting the target waveform to the first estimation model to acquire information about the first peak in the target waveform and the inputting the target waveform to the second estimation model to acquire the information about the second peak in the target waveform is performed.

14. The waveform analysis method according to claim 10, wherein the baseline criterion defines at least one of setting a slope of the baseline to be horizontal in a graph in which a vertical axis is signal intensity while a horizontal axis is time, and setting a slope of the baseline to be a slope of a line connecting one start point and one end point among a plurality of adjacent peaks, and the one start point is a start point of the peak appearing at an earliest time among the plurality of adjacent peaks, and the one end point is an end point of the peak appearing at a latest time among the plurality of adjacent peaks.

15. A recording medium that non-transiently records a computer program, wherein the computer program is executed by at least one processor of a computer to cause the computer to perform the waveform analysis method according to claim 10.

\* \* \* \* \*